(12) United States Patent
Bolin

(10) Patent No.: US 8,353,144 B2
(45) Date of Patent: Jan. 15, 2013

(54) PREFABRICATED COMPOSITE WALL PANEL AND METHOD AND APPARATUS FOR MANUFACTURE AND INSTALLATION THEREOF

(75) Inventor: Joel W. Bolin, Hempstead, TX (US)

(73) Assignee: Joel W. Bolin, Hempstead, TX (US)

( * ) Notice: Subject to any disclaimer, the term of this patent is extended or adjusted under 35 U.S.C. 154(b) by 266 days.

(21) Appl. No.: 12/459,156

(22) Filed: Jun. 26, 2009

(65) Prior Publication Data

US 2010/0325993 A1    Dec. 30, 2010

(51) Int. Cl.
*E04B 1/00* (2006.01)
*E04F 13/08* (2006.01)
*E04C 1/00* (2006.01)
*E04C 2/54* (2006.01)

(52) U.S. Cl. ........ 52/747.11; 52/741.4; 52/384; 52/385; 52/782.1; 52/309.4

(58) Field of Classification Search ............... 52/309.4, 52/794.1, 586.1, 387, 309.1, 309.5, 309.8, 52/309.9, 389, 745.13, 741.4, 782.1, 586.2, 52/384, 385, 388
See application file for complete search history.

(56) References Cited

U.S. PATENT DOCUMENTS

| | | | |
|---|---|---|---|
| 4,848,973 A * | 7/1989 | Yokota et al. | 405/263 |
| 6,164,037 A * | 12/2000 | Passeno | 52/749.11 |
| 6,279,284 B1 * | 8/2001 | Moras | 52/408 |
| 7,757,454 B2 * | 7/2010 | Smith | 52/601 |
| 2002/0174622 A1 * | 11/2002 | Ouellet et al. | 52/745.06 |
| 2009/0068406 A1 * | 3/2009 | Race et al. | 428/156 |
| 2011/0034572 A1 * | 2/2011 | Mueller | 521/68 |

* cited by examiner

*Primary Examiner* — Mark Wendell
(74) *Attorney, Agent, or Firm* — The Matthews Firm

(57) ABSTRACT

A prefabricated composite wall panel has a desired exterior finish defined by thin finish elements of brick, stone or any other suitable material and is adapted for mounting to the wall structure of a building framework by screws or other suitable fasteners. During panel manufacture thin wall finish elements are positioned at predetermined sites within the mold and aligned by alignment members in a pattern defining grout spaces. A grout placement screed having multiple holes arranged in a desired mortar pattern is positioned on the thin finish elements and pulverulent grout is deposited through the holes of the screed and into spaces between the finish elements. After removal of the screed the pulverulent grout is compacted and a liquid uncured polymeric mixture is applied as a contiguous substrate to the back surface of the panel and serves to retain the masonry elements and grout in place and to provide a moisture and air barrier that minimizes the potential for leakage or wicking of water or air infiltration through assembled panels of a wall structure. Finished panels having empty filler element spaces at side edges thereof are fixed to a wall or wall framework of a building with straight edges in abutment and filler elements are positioned to cover joints between the panels.

25 Claims, 10 Drawing Sheets

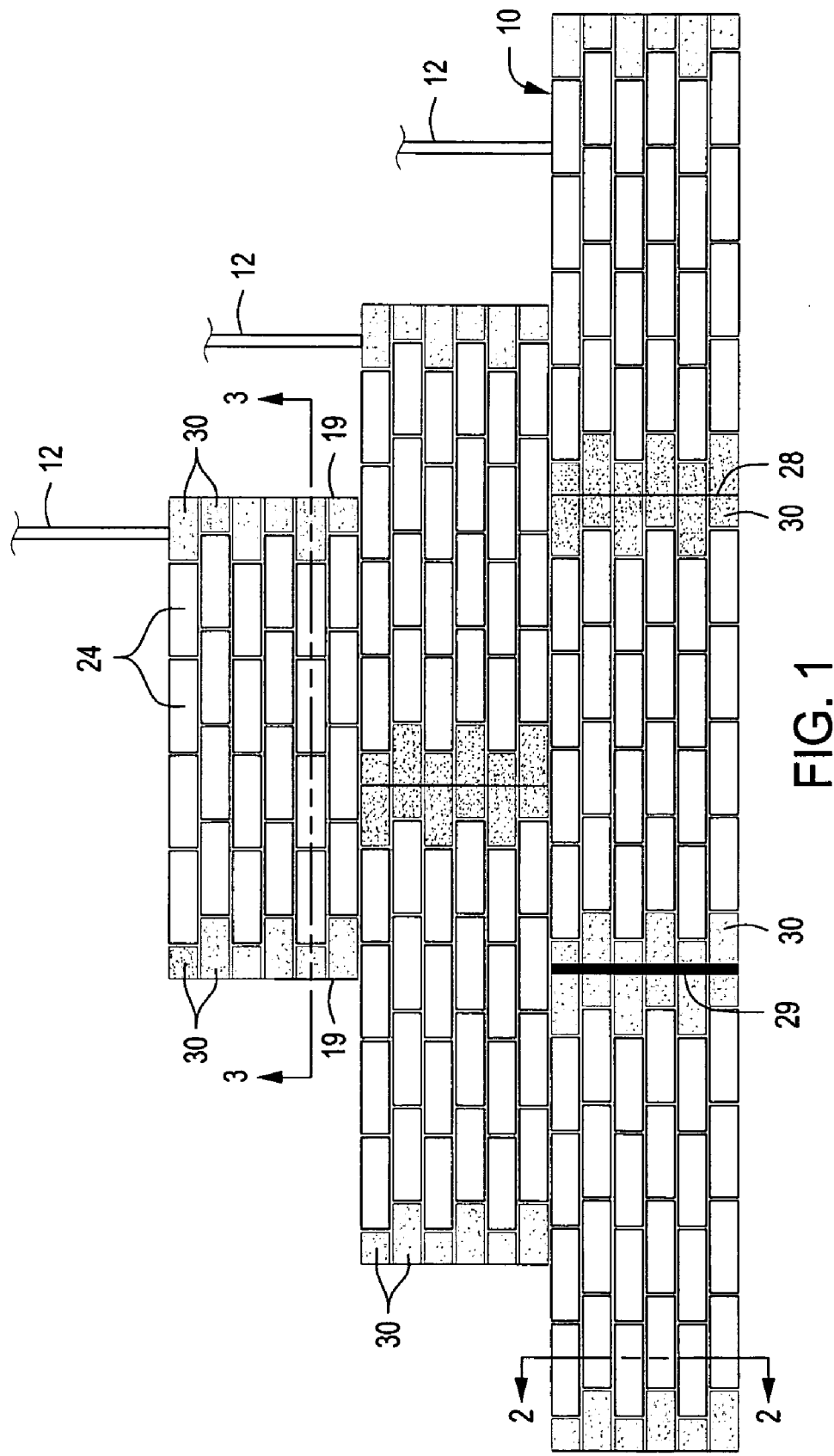

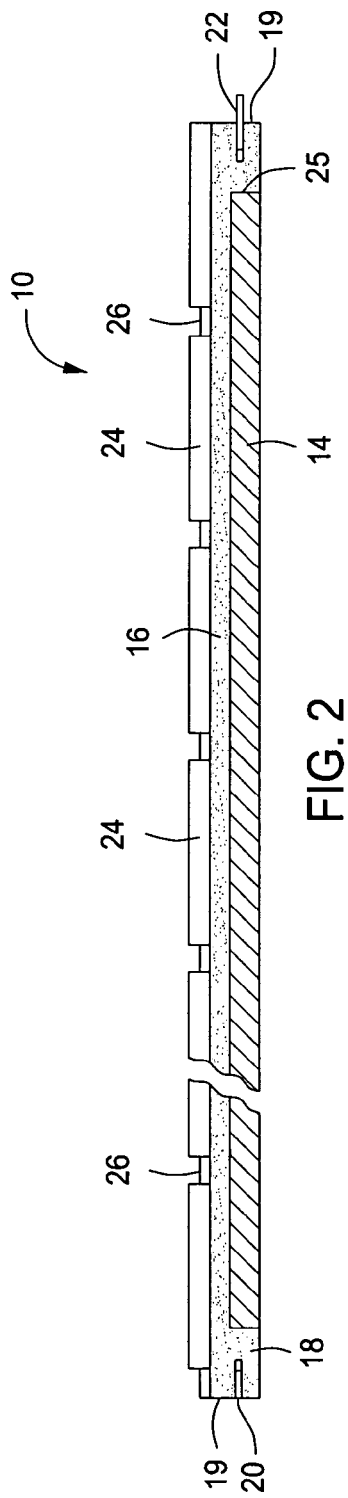
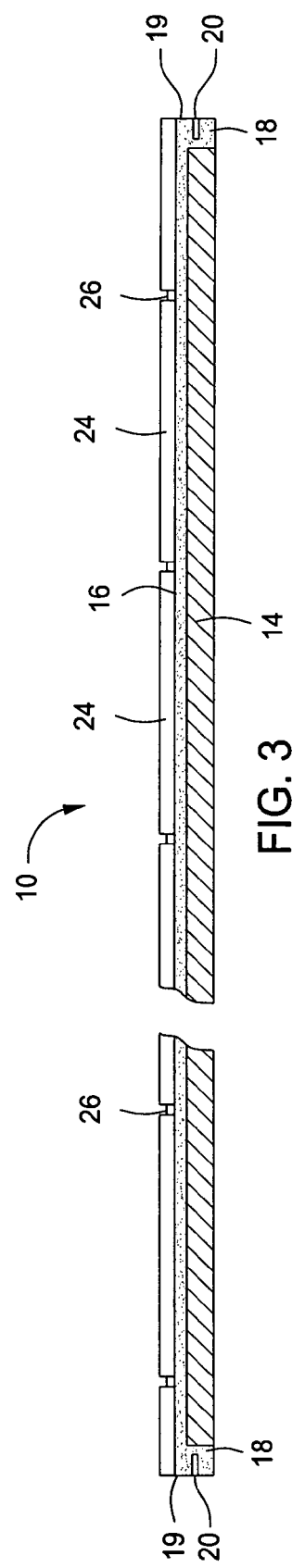

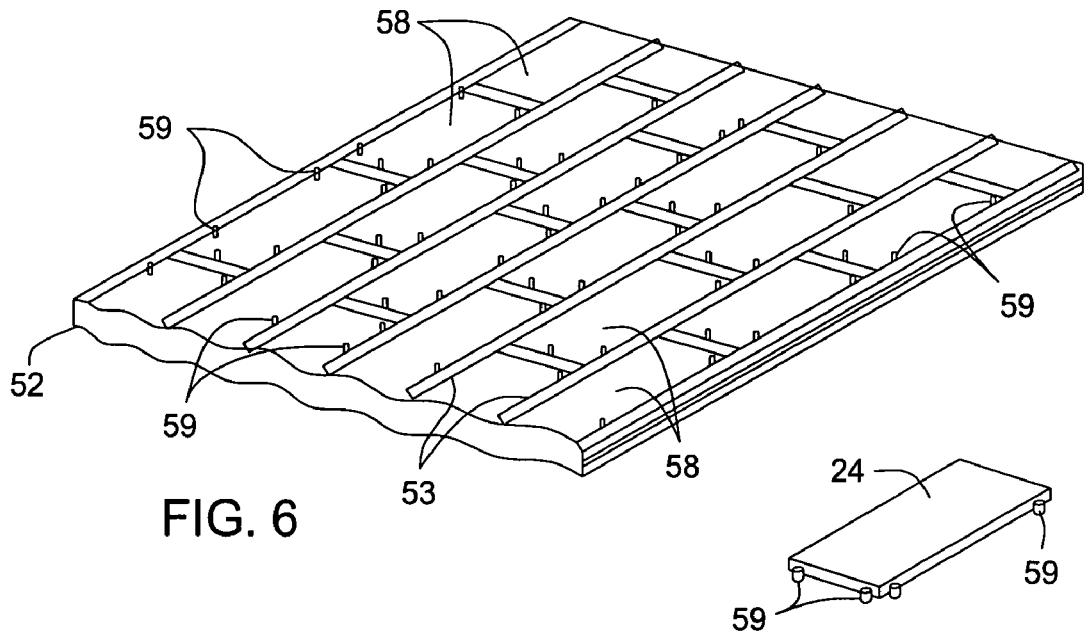
FIG. 6
FIG. 6A
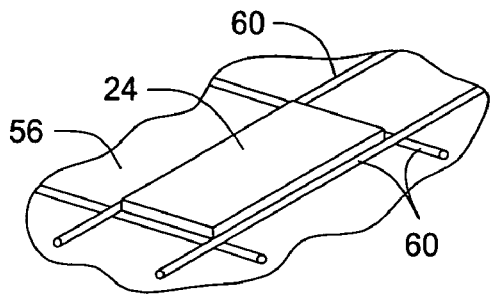
FIG. 6B
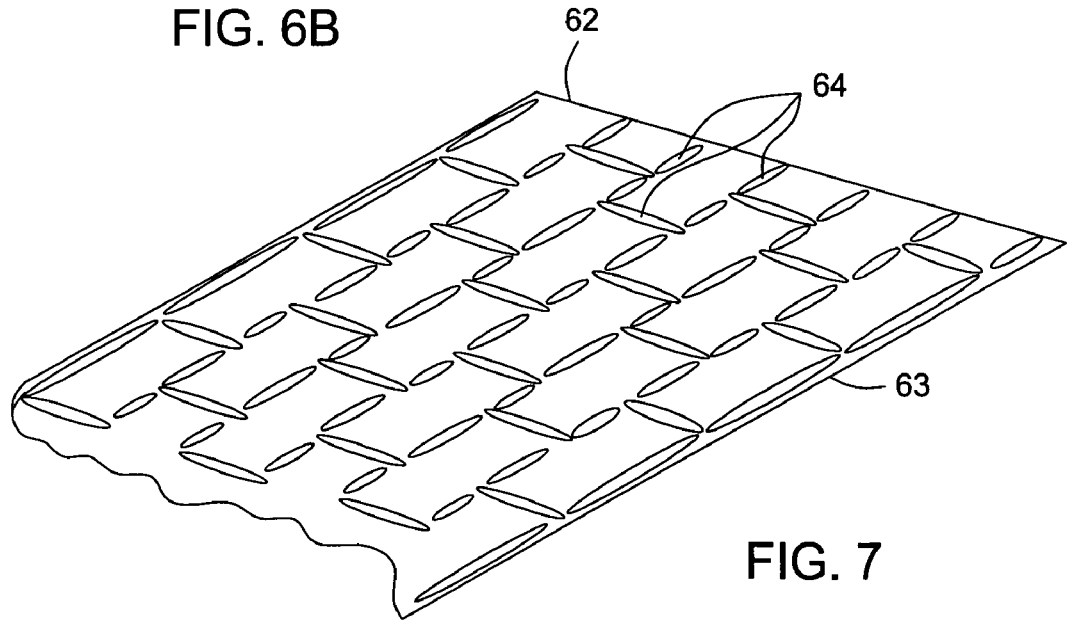
FIG. 7

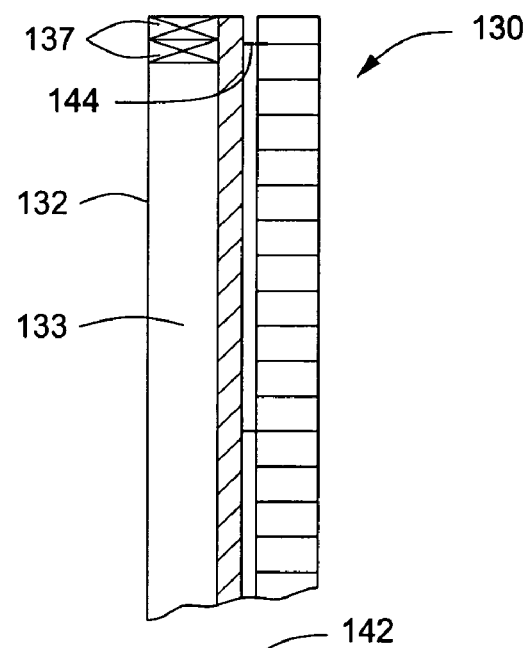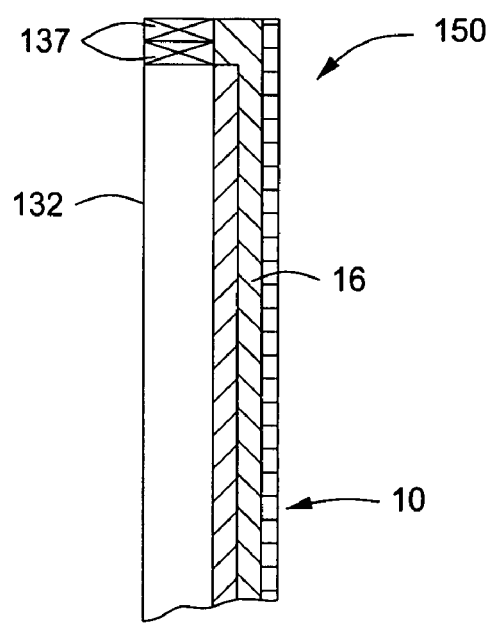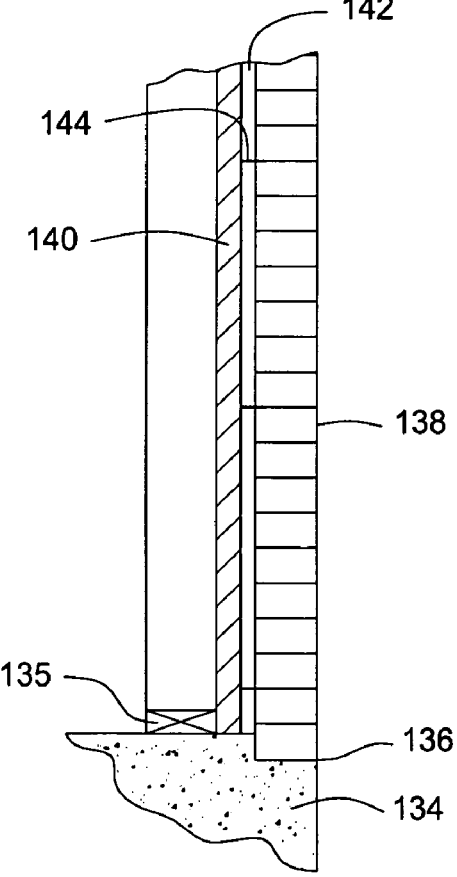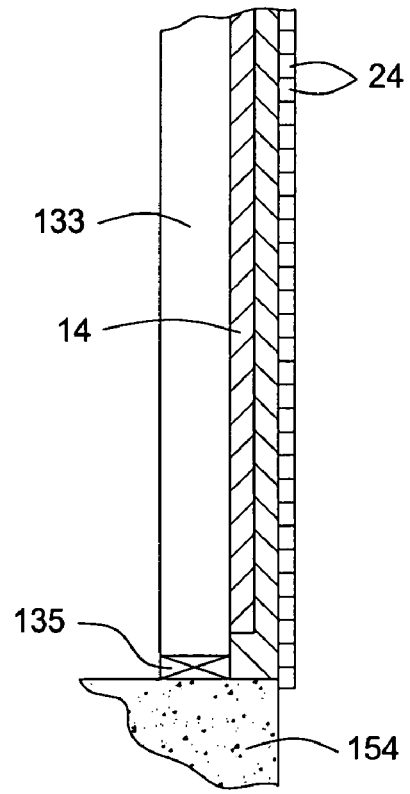
FIG. 11
(PRIOR ART)
FIG. 12

PREFABRICATED COMPOSITE WALL PANEL AND METHOD AND APPARATUS FOR MANUFACTURE AND INSTALLATION THEREOF

BACKGROUND OF THE INVENTION

Field of the Invention

The present invention relates generally to interior and exterior finish wall veneer applications for use in the construction of buildings and building components, i.e., pre-fabricated wall systems. More particularly, the present invention concerns manufactured panels comprised of determined dimensions composed of a wide range of materials, including real brick veneer, rocks or stones, shale, limestone or composites of these materials, all being referred to as masonry materials. Typically the pre-manufactured wall panels are composed of materials having similar size and texture so that the finished wall panels will have the appearance of a conventional masonry wall when the installation is complete. These veneer or composite materials are embedded in or bonded with a moisture impervious substrate composed of a suitable polymer foam material such as poly-urethane mixture, for example, together with a premixed mortar that has the ornamental appearance of having been applied in the conventional manner. When the pre-manufactured wall panels employ thin brick members the bricks and mortar are arranged to replicate a finished brick or composite brick veneer wall structure. The pre-manufactured wall panels are designed to be applied to a building framework to collectively serve as a thermal insulating and moisture-proof wall structure and serve efficiently for the development of a finished wall structure for a building. The present invention also concerns a novel automated manufacturing process for the manufacture of the composite masonry wall panels of this panels of this invention.

SUMMARY OF THE INVENTION

It is the primary feature of the present invention to provide a pre-manufactured brick veneer or masonry composite wall panel that can be applied to a wall framework as a finish material to replace conventional brick and mortar applications and to be used in lieu of typical siding applications. The pre-manufactured finish material of the wall panels function to provide a building structure with the ornamental appearance of a conventional brick veneer or masonry construction without the need to provide for structural foundation support or steel angles for structural support of the wall structure. The pre-manufactured brick veneer or masonry panels provide building contractors with flexibility of design and promote construction efficiency.

It is another feature of the present invention to provide novel pre-manufactured composite brick veneer or masonry wall panels that permit the installation of a complete wall system including sheathing, insulation, vapor barrier and exterior finish in one step.

Another feature of the present invention is to provide a novel manufacturing process for pre-fabricated composite construction panels wherein a one, two or multiple part polymer mixture is utilized to provide for the construction of wall panels having excellent structural integrity, having an internal moisture resistant substrate and providing a panel exterior having the ornamental appearance of a conventional masonry brick or stone wall. Masonry or masonry-like members, such as thin bricks, ceramic tiles, stones, shale, limestone or a wide range of other materials are initially placed exterior surface down and in spaced relation in a mold to form a part of a panel assembly. The façade members may have a rectangular configuration or may have a square, oval, round, triangular or any of a number of other configurations that can be used to make up an attractive or serviceable façade. In the event a stone wall is to be replicated, a repeating stone pattern would be employed and variations in the surface elevation of the stones may be achieved by means of a special stone positioning jig or by removable stone support members. A quantity of dry pulverulent grout material, representing the mortar of a masonry wall, is applied in the spaces between the masonry or masonry-like members and is evenly distributed and compacted. The liquid polymer foam mixture can be poured or injected onto the back face area of the panel assembly and evenly distributed within the mold so that it forms an integral moisture resistant substrate that covers the entirety of the composite construction panel and defines a generally rectangular surround forming the top, bottom and side edges of the panel. A mold cover or closure is then assembled to the mold and the mold is subjected to pressure within a press, thus causing the expanding polymer foam material to completely fill the mold and define the desired geometry and dimension of the pre-manufactured wall panel structure.

Preferably, for automated manufacture of brick or stone composite wall construction panels, the masonry members and grout are positioned within a mold by automated component handling systems. The polymer foam material is mixed and distributed as a layer or substrate onto the back face area of a composite construction panel as the panel is moved on an assembly line or by a polymer mixing and distribution system that moves relative to the panel assembly. After the polymer mixture has been applied within the mold, the mold is closed by a cover or closure handling system. The closed mold is then conveyed along the assembly line or path to a press. The panel containing molds are secured such as by means of the press for a short period of a few minutes during which the polymer becomes expanded to completely fill the mold and to develop a desired density and become cured to the extent that it will retain its molded form. The cured polymer foam material constitutes a moisture proof and thermal insulating substrate of the pre-manufactured composite construction panel structure. The pre-fabricated composite construction panels are then removed from the mold in a substantially complete condition ready for packaging, shipping and installation. The completed composite construction panels may be utilized in virtually any application in any type of building construction and, when assembled to a building framework in a single application step, constitute a wall structure having a sheathing, a moisture barrier, thermal insulation and a decorative and weather resistant exterior façade.

It is an additional feature of the invention to provide pre-fabricated composite construction panels that can be installed to perform both interior and exterior wall structures to provide the same look, feel, texture and function of conventional brick and mortar or stone construction. The pre-fabricated composite construction panels can be manufactured in virtually any color with color integrated mortar simultaneously applied during the panel assembly and molding process.

It is another feature of the present invention to provide for simple panel application techniques for fixing the pre-fabricated composite construction panels to the framework of a building under construction or to the walls of an existing building structure by means of simple fastener devices such as screws. This feature allows for simple and conventional installation techniques and thus requires less skilled labor for its installation process.

Another feature of this invention is that the pre-fabricated composite construction panels are completely water-proof and do not wick water. Mechanical interlocks between adjacent panels hold them tightly together and are arranged to shed water away from the panel joints. The two-part polyurethane composition is a "closed cell" foaming material that does not wick moisture and therefore eliminates the possibility for mold, mildew and similar undesirable characteristics of many different types of conventional building materials.

It is also a feature of the present invention to provide a novel substantially automated manufacturing process for efficient manufacture of pre-fabricated composite construction panels providing contractors with the capability for quickly and efficiently constructing the walls of buildings, wherein the walls have the appearance of conventional masonry walls or walls having other desired weather and moisture resistant finishes.

Briefly, the various objects and features of the present invention are realized through the provision of pre-fabricated composite construction panels that generally serve as the external or internal visible layer or veneer of a wall structure and provide the wall structure with desired appearance and structural characteristics as well as serving as a moisture impervious component of the wall structure and contributing to the thermal barrier characteristics of the resulting wall. For a wall panel structure having the appearance of a conventional brick or brick veneer wall, relatively thin brick, stone or other desired façade or finish elements are integrated with the panel structure and for brick and mortar simulation have similar height and width as compared with the height and width of standard bricks, but have significantly less thickness or depth and thus significantly less weight as compared with the weight of standard bricks. The present invention also provides manufacturing equipment and processes for efficient manufacture of the pre-fabricated composite construction panels.

The pre-fabricated composite construction panels are manufactured utilizing a predetermined mold or panel support and apparatus in association with the mold to provide for accurately spaced location of masonry elements and for the accurate location of panel substrate members and for controlled compression of the panel during polymer curing for achieving the desired foam density of the completed panels. A jig member is placed within the mold base and provides multiple locator pins or locator ridges that enable accurate positioning of each of a plurality of thin brick elements so that mortar or grout spaces are defined between the thin brick elements. A screed member having multiple holes or slots is placed over the thin brick elements or other masonry elements, the holes or slots of the screed member being in alignment with the grout spaces. A special mix of particulate grout material incorporating a binder composition is then deposited through the holes or slots of the screed member into grout spaces between the brick or other masonry members.

After the screed member has been removed, a rather soft compression surface, which can be composed of something such as an open cell polyurethane material, is moved into compressive engagement with the masonry elements and sufficient force is applied to force portions of the soft compression panel into the grout spaces between the thin masonry elements to achieve the desired uniform distribution and compaction of the pulverulent or granular grout material.

After the soft compression surface has been removed, a foamed bonding component, such as a urethane mixture, is then sprayed, poured or otherwise distributed onto the array of spaced masonry or other façade elements defining the exposed back face region of the panel under manufacture to form a contiguous moisture resistant substrate that is bonded to the other panel components and enhances the structural integrity of the panel structure. The bonding substrate is subjected to pressure, such as by means of a press, and is caused to enter into the grout spaces and into the interstices between the grains of the pulverulent or granular grout material and form a bonding agent/grout composite securing the grout particulate within the grout spaces. When viewing the exterior surface of the finished composite construction panel, the bonding agent/grout composite will have the appearance and also the durability of conventional masonry grout or mortar.

The bonding substrate also secures an interior panel of sheathing to the panel assembly. The panel sheathing is preferably formed of plywood, but may be formed of a polymer material, OSB (oriented strand board) or a variety of other materials that may be preferred for an interior or exterior wall surface. After the bonding substrate has been deposited and before it becomes cured, a mold closure releasably containing the panel of interior sheathing, is moved by press apparatus into assembly with a mold base. The press apparatus then applies sufficient pressure to displace and further distribute the uncured bonding substrate, to completely fill the mold and to embed the panel of interior sheathing into the bonding substrate and to cause the curing foam substrate, whether urethane or other polymer foam material, to achieve a desired density. After the foam substrate has become cured to its substantially final form, the mold closure will be removed from the mold base and the completed composite construction panel will then be removed from the mold base and subjected to a cleaning process and then will be transported to a completed panel storage site.

The pre-fabricated composite construction panels are manufactured utilizing nominal and typical structural dimensioning to parallel existing construction distinctions and support new construction in the same way. Preferably, the panels have a thickness range of from about 1⅛" to 2" and are approximately 4'×8' in overall panel size. This typical panel size is suitable for wall construction according to well developed commercial practices and provides for ease and efficiency of handling by construction personnel, without any need for special handling equipment. However, it should be borne in mind that the dimensions of the composite construction panels may vary according to the dimensions of the building framework structure for which attachment is intended. Alternatively, smaller construction panels, for example pre-manufactured panels having a dimension of 48"W×19 13/16"H×1⅛"D, may be provided for easier handling. The pre-manufactured composite construction panels have straight top, bottom, and side edges, so as to permit assembly of the panels to the conventional 16" or 24" on-center wall framework of a building structure. However, it is to be understood that the panel thickness may be greater or lesser depending on the needs and desires of the user, without departing from the spirit and scope of the present invention. The pre-manufactured masonry construction panels are manufactured with empty brick or stone spaces at the side edges thereof, the mortar around which is, at least partially, pre-applied. During the installation process at a job site, after the panels have been secured to the wall framework structure of a building by screws or other suitable fasteners, the empty brick or stone spaces will be filled by means of filler elements that bridge the straight side edges of adjacent panels. The mortar between the insert elements is pre-applied or otherwise repaired to cover and conceal screws, fasteners, gaps, joints, exposed edges, and the like. The filler elements may be secured in place by means of silicon bonding material or any other adhesive material or bonding agent that provides exceptional retention capability over many years of service. The filler elements may also be retained in place by means of screws or other mechanical fasteners, which may be employed in association with bonding or adhesive material. The resulting pre-manufactured composite construction panel installation will have the ornamental appearance of a conventional brick and mortar wall or stone wall and will have exceptional resistance to a wide range of weather conditions for many years.

The composite panel manufacturing process may be accomplished by successively manufacturing single panels if desired. However it will be desirable and more economically practical to provide an automated panel manufacturing process so that panel components are moved along a continuous assembly line to successive manufacturing stations in serial fashion, with two or more composite panels being moved and processed through assembly at any point in time. Panel components can be obtained from adjacent storage sites and moved by automated systems to the respective manufacturing stations and accurately positioned for efficient panel assembly. During distribution and curing of the polymer foam substrate of the panels, mechanical pressure is applied to a mold base and closure assembly or to a panel support to achieve integration of all of the panel components so that the resulting panels can be used efficiently to provide the wall finish of a building structure.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

Figure 4:
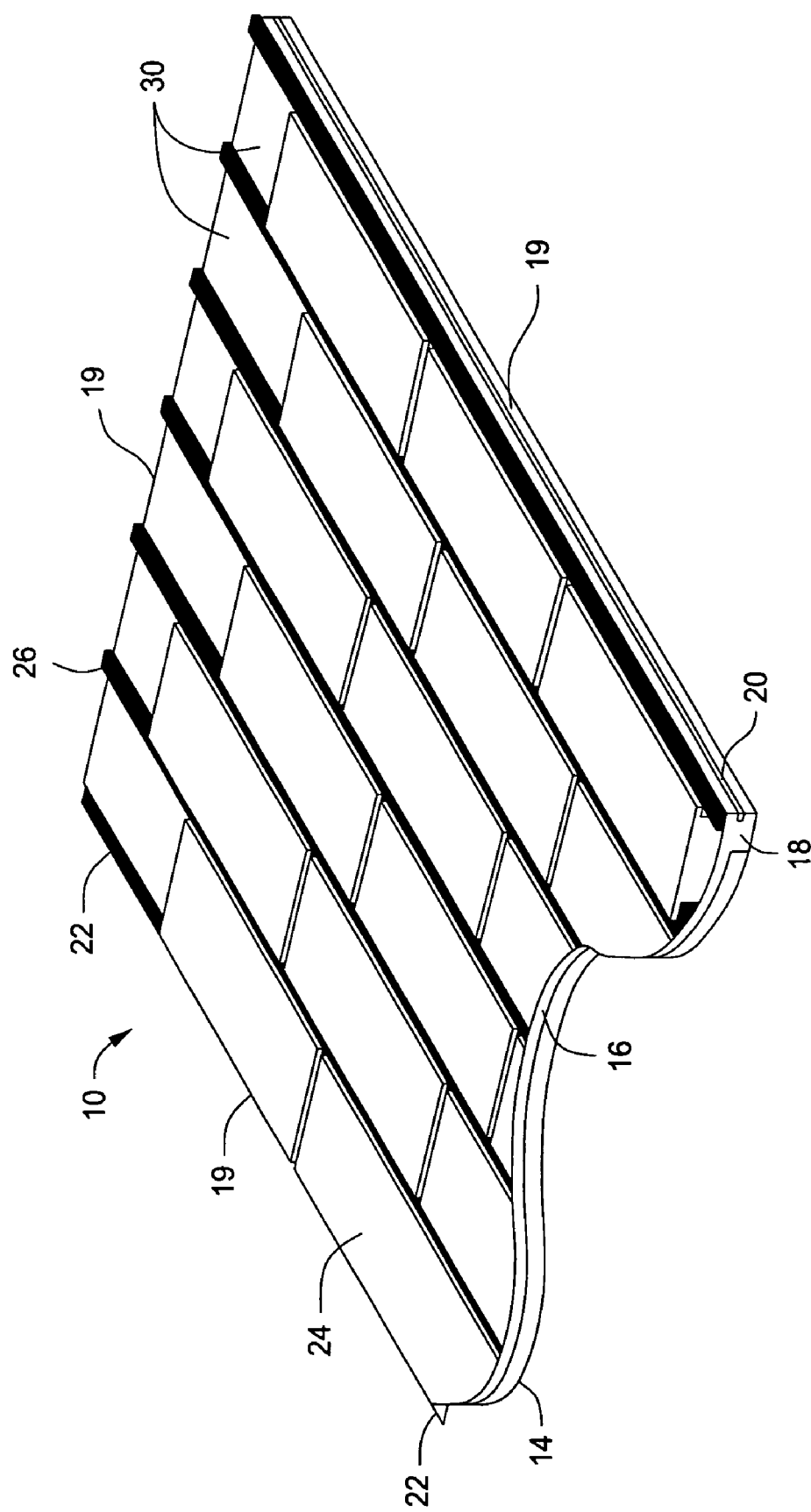

The drawings illustrate panel construction and show the machinery and process or method that is employed for manufacture of the construction of polymer brick or composite wall panels according to the principles of the present invention.

Figure 5:
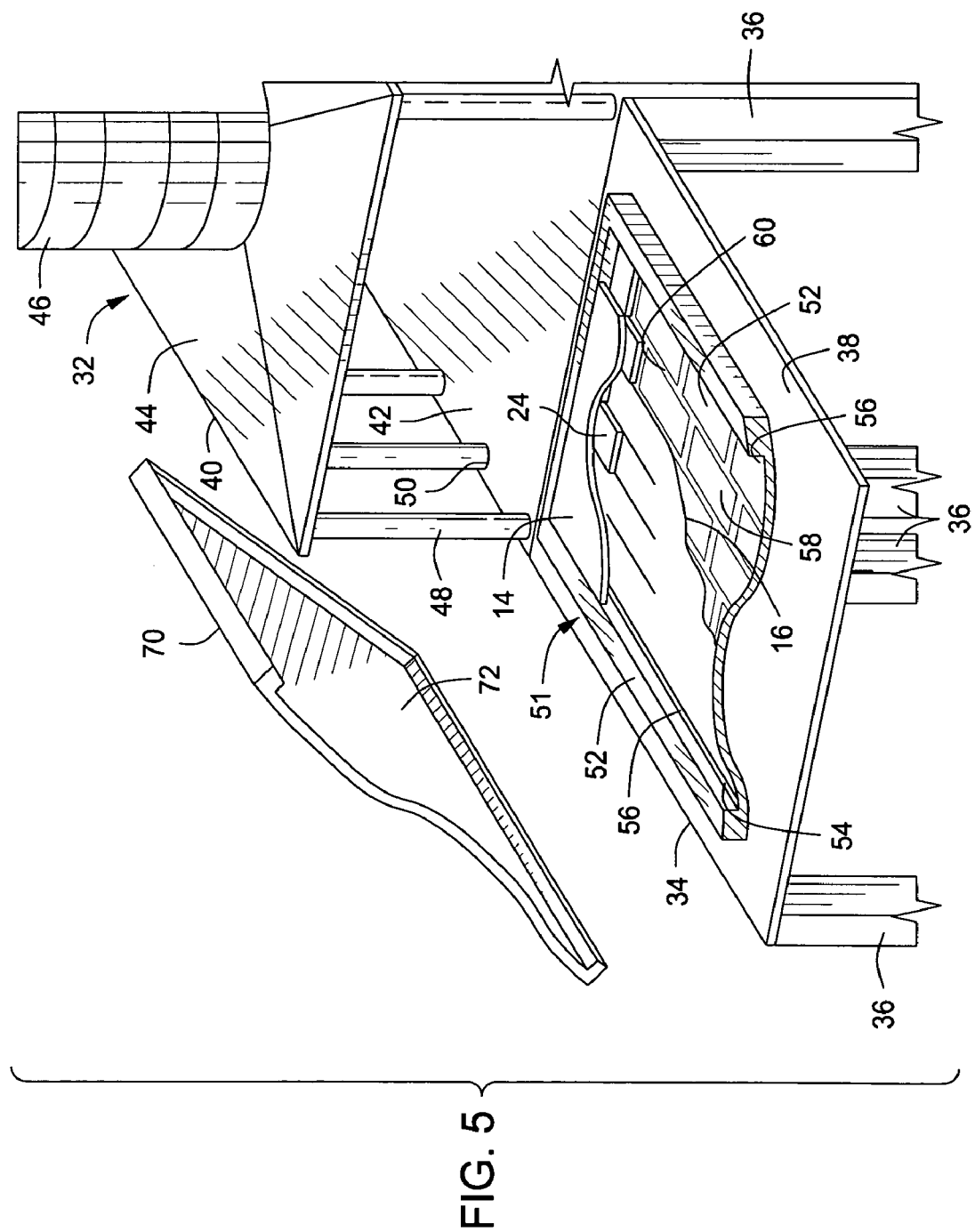
Figure 7A:
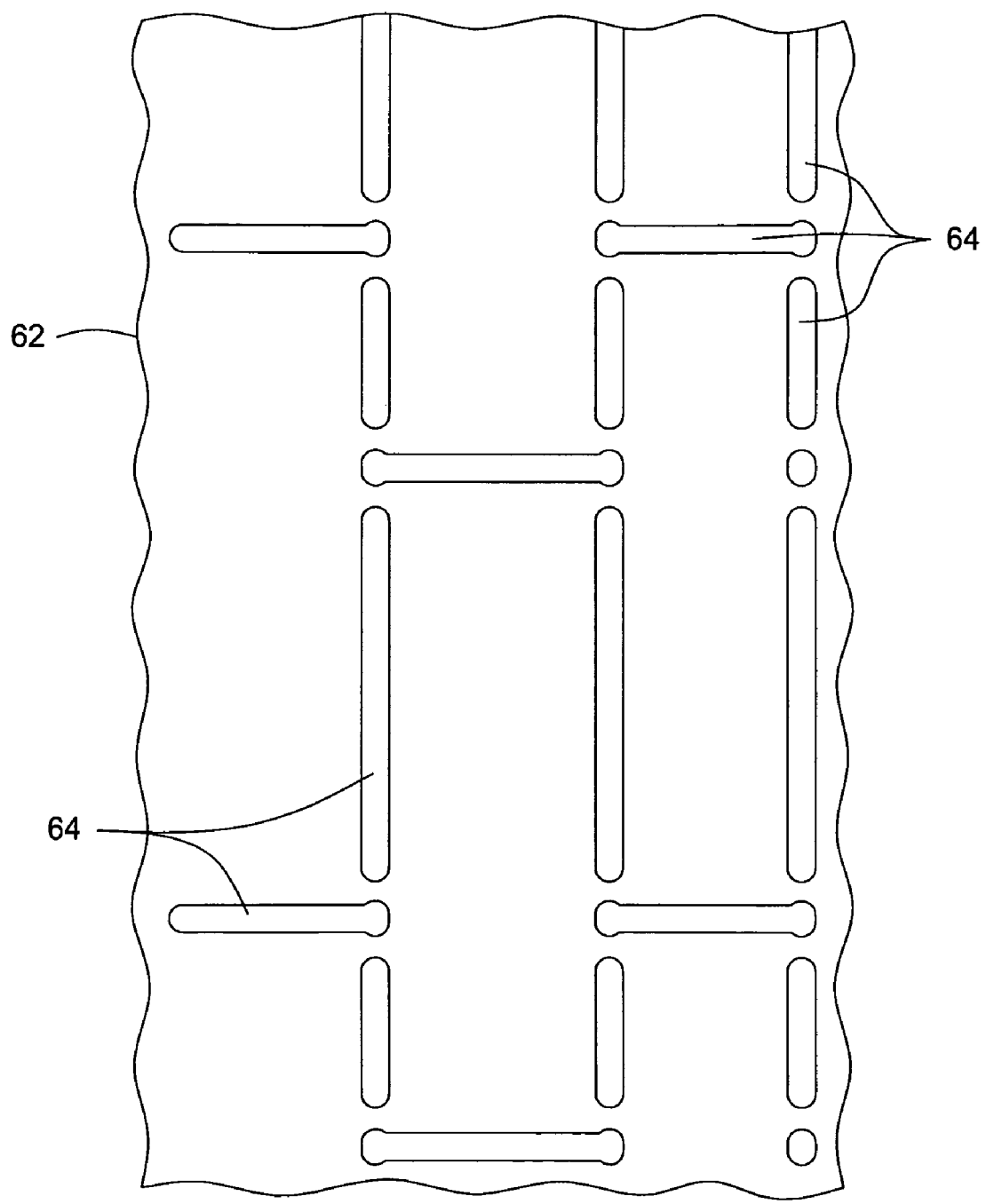
Figure 8:
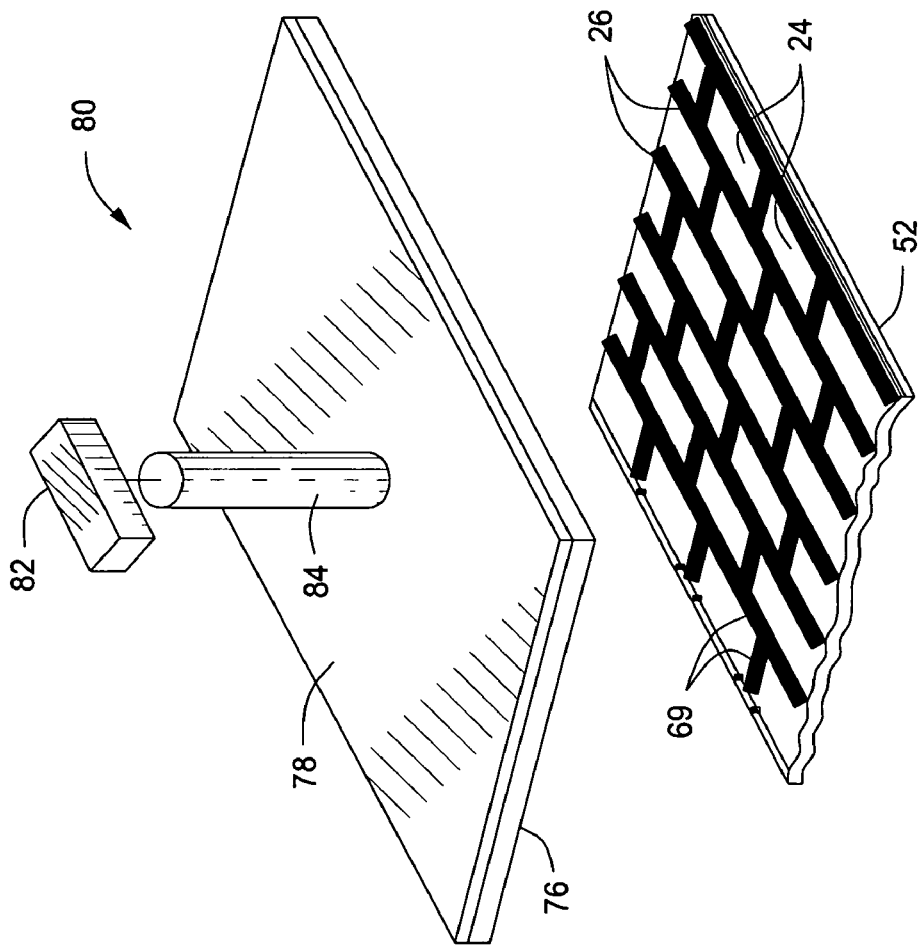
Figure 9:
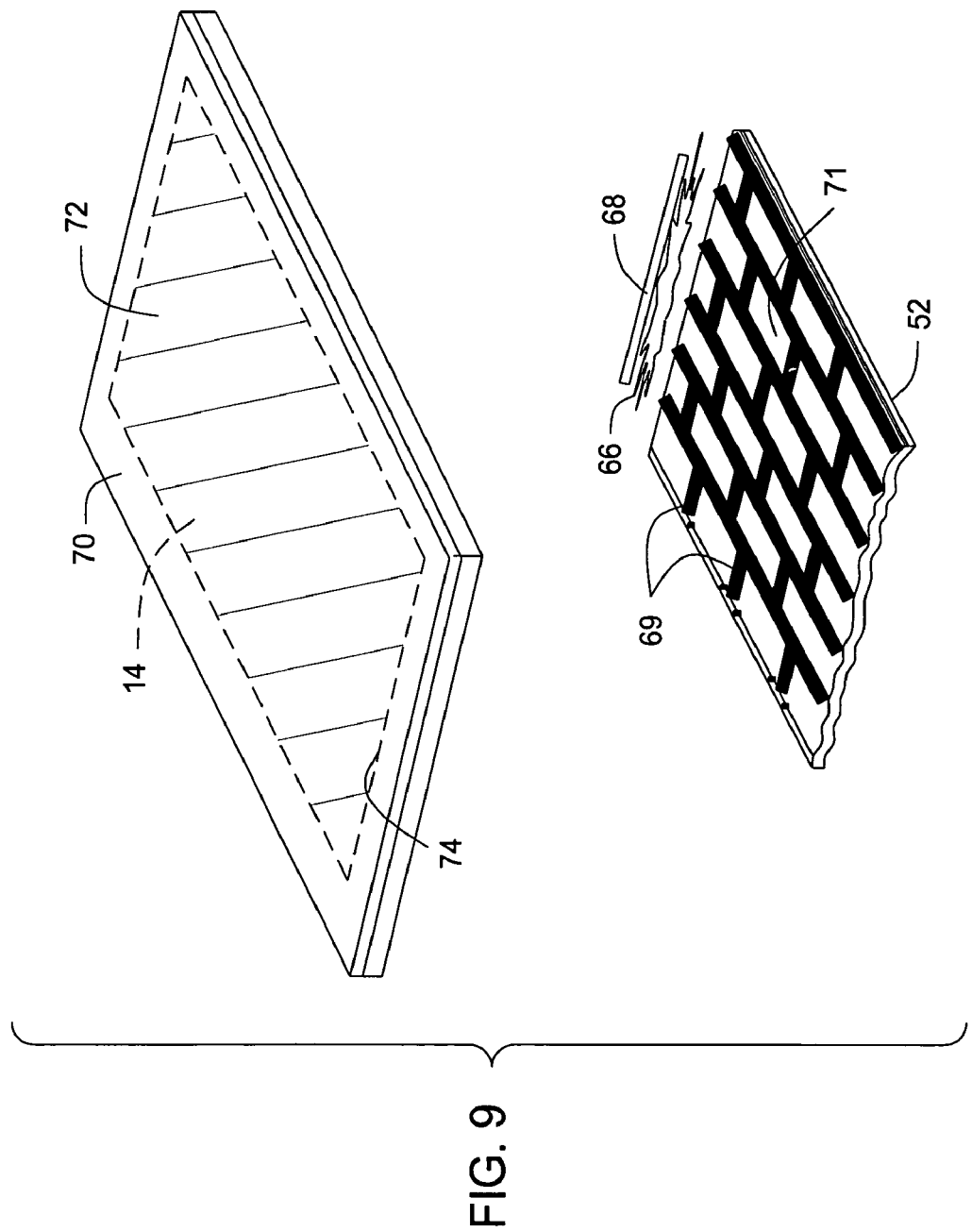
Figure 10:
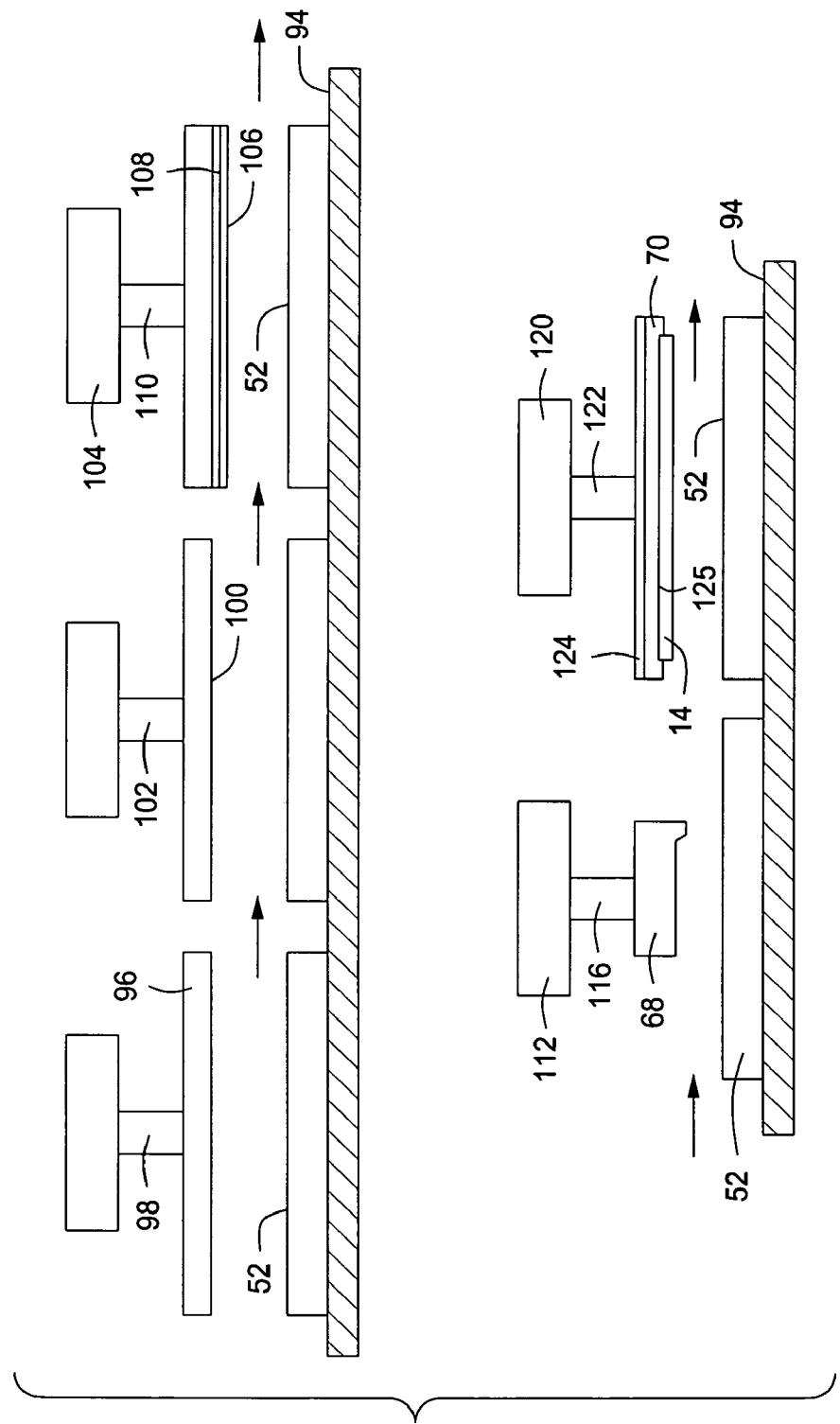

In the Drawings:

FIG. 1 is an elevational view illustrating a plurality of finished pre-manufactured composite construction panels embodying the principles of the present invention and showing application of the panels to the framework of a building structure and further showing missing brick sites at the ends of adjacent composite construction panels;

FIG. 2 is a vertical sectional view taken along line 2-2 of FIG. 1 illustrating the detailed structure of the pre-manufactured composite construction panels;

FIG. 3 is a horizontal sectional view taken along line 3-3 of FIG. 1 and further illustrating the detailed structure of the pre-manufactured composite construction panels;

FIG. 4 is an isometric illustration showing a part of a polymer brick or composite wall panel constructed according to the principles of the present invention and showing the relative positions of the various components from which the polymer brick or composite wall panels are formed;

FIG. 5 is an exploded isometric illustration showing a polymer brick or composite wall panel of the present invention being manufactured by a machine and showing a mold case cap member being separated from a production table of the machine to permit a portion of the panel to be seen in relation to the structure of the machine;

FIG. 6 is an isometric illustration showing a part of a masonry element alignment jig having a plurality of locator pins or projections that extend above the surface of the jig and provide for accurate location of each of a plurality of masonry elements;

FIG. 6A is an isometric illustration showing the alignment pin arrangement for accurately positioning each of the rectangular brick-like masonry elements of a wall panel constructed according to the principles of the present invention;

FIG. 6B is a partial isometric illustration similar to FIG. 6A and represents an alternative embodiment of the present invention employing ridges for specific location of thin masonry elements during manufacture of composite construction panels;

FIG. 7 is an isometric illustration showing a screed member having strategically arranged and shaped grout holes or slots through which grout particulate is deposited into the grout spaces between the masonry elements of a wall panel of the present invention;

FIG. 7A is a partial plan view showing a portion of the screed member of FIG. 7 further showing the arrangement and configuration of grout application holes or slots of the screed member for ensuring controlled deposit of grout particulate in the spaces between the masonry elements of the construction panel structure;

FIG. 8 is an exploded isometric illustration showing an open-cell polymer foam sponge panel with a rigid backing being positioned above a masonry element alignment jig, with rectangular masonry elements and grout in place, in readiness for compacting the grout particulate;

FIG. 9 is an exploded isometric illustration showing a masonry element alignment jig and showing a foam substrate applicator for mixing and applying a substrate of polymer foam binding material to the jig to secure the masonry elements and grout in place and further showing an upper jig or mold lid releasably containing a sheathing or backing substrate member in position for assembly with the uncured urethane foam substrate;

FIG. 10 is a schematic illustration showing an automated manufacturing process and system permitting serial movement of two or more composite construction panels along an assembly line to achieve consistent, uniform, and enhanced manufacturing volume of the completed composite construction panels of the present invention;

FIG. 11 is a vertical sectional view showing a conventional exterior wall construction having a brick and mortar veneer and representing the prior art; and FIG. 12 is a vertical sectional view showing an exterior wall construction that is finished with composite construction panels manufactured according to the principles of the present invention, representing a comparison of this invention with the conventional wall construction of FIG. 11.

DETAILED DESCRIPTION OF PREFERRED EMBODIMENT

It is to be understood that the principal aspect of the present invention is a pre-manufactured composite construction panel that is primarily intended for wall construction and has an exterior surface façade that is defined by a wide range of finish materials, including thin brick elements, stone elements, ceramic elements or the like. The exterior surface of the composite panels is intended to provide the exterior surface of a building structure or a surface of an interior wall if desired. The present invention also concerns the method and process for manufacturing composite construction panels and the apparatus and method that is utilized during the manufacturing process. This invention further concerns the method for installing the prefabricated composite wall panels on the wall framework structure of a building. This invention also concerns the provision of an automated manufacturing system for achieving manufacture of the composite construction panels of this invention. The characteristics of the finished pre-manufactured composite construction panels according to the present invention are now discussed in detail in connection with the drawings for illustration of the principles of this invention.

Referring now to FIG. 1 of the drawings, a plurality of pre-manufactured composite construction panels, shown generally at 10 are illustrated in the process of being fixed to the wall framework members 12 of the wall structure of a building to form an exterior weather resistant surface of the wall. To simplify the illustration of FIG. 1, only parts of the framework members 12 of the building structure are shown. While the prefabricated composite wall construction panels are especially suitable to form the finish or external façade of the exterior walls of a building, it should be borne in mind that the composite construction panels can be easily provided with surface finish materials that promote the use of the panels to form interior walls of buildings as well. For example, any interior wall of a building that might be subject to contact by water, such as bathrooms, kitchens, laundry rooms, etc. can be provided with prefabricated composite wall panels that also serve as moisture barriers to minimize potential damage by water and to promote efficient and effective cleaning of the walls. These wall panels may be provided with various types of water resistant surface finish materials, such as ceramic tile, glass or polymer tile, and polymer wall surfaces, for example.

The term "masonry" as used herein is intended to encompass a wide range of objects composed of masonry materials, natural and manufactured stone materials, and a wide variety of artificial masonry or stone materials, as well as a wide variety of special effect finish or façade materials that might be used in the building construction trade to provide visible wall surfaces of desired appearance. The terms "brick members", "thin bricks", "finish elements" and "thin masonry elements" as used herein are intended to encompass any of a number of thin masonry or masonry-like members of rectangular, square, round, ovoid, triangular or other suitable configuration.

The masonry or façade members may have the external appearance of the conventional bricks of a masonry or masonry veneer wall structure, or any thin natural or manufactured stone members for construction of stone or stone veneer wall surfaces of a building. Where natural or artificial stone is used as a finish material it will be provided in a "repeating pattern" so that individual stone members may be positioned at specifically designed locations within a jig during panel manufacture. The term "façade members" is intended to include a wide variety of wall surface materials, such as ceramic tile, composite materials including wood, various polymer materials, glass, rubber like materials, etc. The pre-manufactured composite construction panels of this invention also have a thermal insulating quality that exceeds the thermal insulating characteristics of conventional masonry walls and define an efficient water barrier for external wall surface applications. The panels provide a thinner profile for the exterior of a building, utilizing significantly less time of application as compared with installation of the various layers (substrate, vapor barrier, insulation, brick, mortar, etc.) as required by the building codes for conventional masonry walls or historic construction methods. Since the foundation of a building structure will not need to provide support for a typical brick and mortar wall, the foundation may be of lighter weight construction thus providing weight and cost savings, without sacrificing the durability and serviceability of a building structure.

The pre-manufactured composite construction panels 10 of FIGS. 1-3 are composite panels having a wood or masonry sheathing or backing panel 14 that is embedded within or in fixed assembly with a moisture resistant panel substrate 16 composed of polyurethane, polyurethane foam or any one of a number of suitable single or multi-component polymeric materials that form an impenetrable moisture barrier within the panel structure. The polymer substrate 16 is a multi-function layer that is one of the components of the pre-manufactured composite construction panels 10. The pre-manufactured composite construction panels have the typical flexibility of plywood or similar materials so that a wall of a building structure may flex or move slightly in response to naturally occurring forces without resulting in fracturing or cracking of the walls or of the thin brick elements, which is often found in conventionally-built construction. The polyurethane or other polymer substrate material of the pre-manufactured composite construction panels is preferably of rectangular configuration and defines a rectangular surround structure 18 having straight panel edges 19 defining the top, bottom and sides of the panel. The pre-manufactured composite construction panels are typically provided in 48"×96" or 48"×32⅝" sizes so as to fit the on-center stud spacing of a conventional building framework. However, the panels may be of larger or smaller dimension depending on the size and/or orientation of the thin masonry elements being used and/or on the preferences of the designer or contractor using the panels for building construction.

As shown in FIG. 2, the rectangular surround structure 18 of the panel contains spline openings, channels or receptacles 20 within which spline members 22 are received to ensure precise edge to edge alignment of adjacent panels. Preferably, one side of each panel defines a spline slot or channel and the opposite side of the adjacent panel has a spline member 22 projecting from it. The spline member 22 is inserted into the spline channel 20 of the adjacent panel during installation in the field to ensure that the edges 19 of adjacent panels are precisely aligned. This is especially important when the external façade defined by assembled panels is composed of thin brick members or thin stone members to represent a masonry wall. However, if desired, each of the surround portions of the panel structure can define spline slots. In such case, spline members are positioned within the adjacent spline slots during panel assembly in the field. In addition to maintaining the top, bottom and side edges of adjacent panels in precise alignment, the splines also assist in providing a weather-tight closure of the joint between the straight side edges of adjacent panels to minimize the potential for ingress of water and/or air infiltration through the panel joints of a completed composite construction paneled wall structure. Optionally, closure and sealing between the composite wall panels can be further enhanced by application of interlocking flashing strips 29 of metal, polymer or any other suitable flashing material over the joints between the straight side edges of adjacent panels during building construction as shown in FIG. 1. For purposes of simplicity only one of the flashing strips 29 is shown. However, it is to be understood that, if desired, each of the panel joints 28 may be covered by flashing to enhance the water resistant character of a wall that is composed of multiple multiple composite construction panels. To enable installation of the flashing strips, the lateral grout lines should not extend completely to the side edges of the panels as shown in FIG. 4 or the ends of the grout lines can be removed to provide flat panel edge surfaces for mounting of the flashing. The flashing strips 29 may be secured in place by screws of by any other suitable retainer members. Sealing of the panel joints 28 is further enhanced by application of a moisture impervious layer of silicon caulking or other sealing material of suitable composition that is typically applied over the panel joints in liquid or paste form prior to application of the closure strips or fill-in thin brick elements. The flashing strips 29 may be applied over the joint caulking material if desired. The moisture impervious layer will subsequently cure to a durable form. The closure strips are attached at the panel joints by fasteners, such as screws or nails or are attached by means of a suitable bonding material. The closure strips and joint sealant will not be visible in a completed installation since they will be covered by thin bricks, stones or other façade members and by mortar during completion of a wall installation at a job site.

A plurality of masonry or masonry-like finish or façade elements 24, typically referred to herein as thin brick elements, façade members or finish members, are precisely placed in a desired pattern within a mold and a dry pulverulent grout material 26 is placed and compacted within grout spaces between the thin brick elements. These masonry or masonry-like finish or façade elements 24 include a wide variety of wall surface materials including ceramic tiles, natural or artificial stones. It is appropriate that the façade elements 24 have on the surface of the element attached to the panel and away from the exposed surface, a retention surface of a somewhat porous characteristic, thus defining minute interstices into which uncured liquid polymeric material will penetrate the interstices and establish optimum retention characteristics between the façade members and the backing of the panel. The dry pulverulent grout particulate material 26 is placed within the gaps or spaces between the top, bottom and side edges of adjacent brick members according to the process described below, and is compacted prior to application of application of the polymeric foam substrate. It should be borne in mind that the grout particulate material is only located in the spaces between the façade members and is not employed beneath the façade members to secure the façade members to the panel structure. The polymeric component of the composite panel assembly serves to affix the façade members to the panel. Even distribution and compaction of the grout material within the grout spaces can be accomplished by subjecting the grout to mechanical pressure, such as by the press mechanism of a panel manufacturing machine. The press mechanism could be composed of a resilient pad of open cell polymeric foam or similar resilient material attached to a press plate, which is deformed into the grout spaces by the force of the press. The resilient material engages the grout particulate and accomplishes even distribution and compaction of the grout within the grout spaces. Preferably, the grout particulate will have a binder composition mixed with it so that the compacted grout material will retain its compacted state during the panel manufacturing process.

The thin brick elements and the grout material are secured to the composite wall panel structure 16 by the adhesion that occurs as an uncured liquid polymeric foam mixture is sprayed, poured or otherwise placed as an integral, multi-function layer or substrate covering the back surfaces of spaced thin finish elements within the mold. The polymer or polymeric foam substrate serves to fix the thin finish elements to the composite construction panel structure. The polymeric foam substrate is confined within a mold in its uncured state and is subjected to the mechanical pressure of the press, causing the polymeric foam to assume the configuration of an integral polymeric substrate covering the entirety of the panel and forming a moisture resistant and thermal insulating layer of the panel structure. The mold causes the polymeric foam substrate to define a surround or border structure of the panel that is preferably of generally rectangular configuration but may have any other configuration that is determined by the configuration of the mold recess or receptacle of the mold. If desired however, as an alternative, the thin brick finish or façade elements 24 may be fixed to the polymeric substrate of the panel such as by a suitable such as by a suitable cement or bonding agent or by any other means for permanent mechanical retention, similar to the attachment of the thin brick elements over the "missing brick" spaces 30 at the edges of each panel with the next.

As shown in FIGS. 1-3, the finish elements 24 are in the form of thin brick or brick-like masonry members so that a finished composite wall composed of multiple panels will have the appearance and serviceability of a conventional brick and mortar wall. In the alternative, the masonry finish elements 24 may be in the form of thin, relatively flat natural or artificial stones, thus providing a wall structure composed of the panels with the appearance of a building constructed of stone or provided with stone veneer. Where stones are employed in composite panel construction, it should be borne in mind that the stones will need to be shaped so as to accommodate a repeating façade pattern. This will permit the stones to be retained by a specially designed jig of that pattern during panel manufacture. To provide composite construction panels replicating a stone wall the jig and/or the stones may be specially designed to achieve uneven face surface positioning. Materials other than masonry or stone members may also be used to form the exterior finish or façade of the pre-manufactured construction panels so that the resulting wall structure may have any desired appearance.

As is evident in FIGS. 1 and 4, abutting straight side edges 19 of adjacent panels fit together to form straight side edge joints 28. The pattern of the brick-like masonry elements 24 at the side portions of the panels terminate in spaced relation with or are set back from the straight side edges 19 to define "missing brick" spaces 30. It should be noted that the masonry element sites at the end portions of adjacent panels bridge or extend across the straight side edge joints 28. The grout lines above and below the missing brick spaces extend to the side edges of the panel to identify where the filler brick elements are to be located. In the case of rectangular masonry elements such as thin bricks, the filler bricks will need to be fixed to the adjacent sides of two panels after the panels have been mounted to a building framework so that the panel joints will not be apparent. The size and arrangement of the thin masonry elements 24, when the thin masonry elements are intended to represent the bricks of a brick wall, is such that the empty masonry element sites or missing brick spaces 30 between the edges of the bricks of adjacent panels can be filled by installation of several individual thin brick members or by installation of a thin brick filler assembly that can be applied to the wall structure in the field to completely fill the missing brick spaces 30 of adjacent panels. With the missing brick spaces 30 filled in this manner and grout applied in the spaces between the adjacent thin brick members, the appearance of the completed wall will be substantially identical with the appearance of a conventional brick and mortar wall. The panel abutment joints 28 will not be visible when the wall panel installation has been completed.

With reference to FIG. 4, the pre-manufactured composite construction panel 10 is shown in greater detail. The pre-manufactured composite construction panel 10 is shown to be positioned substantially horizontally, which is the preferred position during its manufacture as described below in connection with FIGS. 8 and 9. As described above, a rectangular sheathing or backing panel 14 composed of wood, masonry, OSB, polymer or other suitable sheathing material forms an interior surface portion of the panel structure. A moisture impervious or resistant multi-function polymeric substrate 16, composed of polyurethane, polyurethane foam or any one of a number of other suitable single or multi-component polymeric materials, is integrated with the sheathing or backing panel 14 and provides a generally rectangular surround structure 18 that is integral therewith and encompasses the sheathing panel edges 25. The polymeric substrate 16 provides the pre-manufactured composite construction panels with moisture resistance and thermal insulation characteristics as well as materially enhancing the structural integrity of the panels. The surround structure 18 is also of rectangular or other desired configuration, typically of 4'×8' dimension and defines substantially straight surround edges 19 at the top, bottom and sides of the pre-manufactured composite construction panel 10. However, it is to be borne in mind that the composite construction panels may be of any size that is suitable for the on-center frequency of building framework members and/or as required by the size and/or orientation of the thin brick elements. On one or both of the sides of the panel structure and on the upper or lower edge, the surround structure 18 contains spline slots or channels 20 to receive spline members 22 that project from the opposite side, top or bottom of an adjacent panel to maintain the edges of adjacent panels in assembly and in precise alignment with one another. The spline members 22 also enhance the structural integrity of the panel assembly of a wall structure and provide for closure of the joints 28 between adjacent panels to ensure against ingress or wicking of water and/or air through a completed wall structure that is composed of multiple composite construction panels.

Thin brick or other façade members 24 are shown in FIG. 2 to be positioned in properly spaced relation and are partially embedded in, and are fixed to, the polymeric foam substrate 16. The thin brick members are separated by grout lines 26 to provide the appearance and function of a conventional brick or brick veneer wall structure. At each end of the panel structure brick voids or empty brick spaces 30 are defined, as shown in FIGS. 1 and 4, so that the side edges 19 of the completed composite construction panels can be straight. After the composite construction panels have been secured to the framework 12 of a wall structure, such as by screws or any other suitable fasteners, the empty brick spaces or voids 30 of adjacent composite construction panels can be filled with similar thin brick members or by a filler assembly of thin brick members to fill the brick voids or empty brick spaces 30 and bridge the straight panel joints 28 that are defined by abutment of the side edges 19 of the adjacent composite construction panels. Grout material can be sprayed or otherwise applied in the grout spaces between the filler brick members to cover any damage that might be caused by screws or other fasteners that are applied to the grout line and/or to dress up any grout line that shows a gap or void. Any of a number of suitable adhesive materials is applied to the empty brick spaces or voids 30 and, if desired, to the filler brick elements to provide the function of permanently securing the filler brick elements within the empty brick spaces or voids 30. The preferred adhesive composition should be resistant to damage by ultra violet light and resistant to damage by a wide range of weather conditions. After the filler brick or other masonry elements have been bonded or otherwise secured in place within the empty brick spaces or voids 30, a thin line of silicon or other suitable calking composition, such as a two-component epoxy for example, is caulked in the grout space of each filler brick. The silicon or other desirable caulking composition, for long term applications, should conform to a minimum standard of performance, concerning factors such as ultra-violet light resistance, commercial grade, minimum applied thickness, desired color, etc. The silicon functions as a surface adhesive to bond the grout between the bricks or other façade members and to bond the thin brick members in place within the missing brick spaces at the edges of the panels. The caulking material, a silicon or other suitable material, may also be employed to assist in the sealing capability of the splines at the edges of the panels. While the silicon or other caulking material is in its uncured state, grout particulate or a solution of grout particulate and a desired carrier is dusted, air blasted or otherwise applied within the grout spaces between the filler bricks and becomes adhered to, or embedded in, the caulking material so that it remains permanently in place and replicates the presence of conventional mortar. The resulting pre-manufactured composite construction panel wall will have the appearance of a conventional masonry wall structure. The joints 28 between adjacent composite construction panels 10 will not be visible in the completed composite construction panel installation. Typical brick façade installations require a cleaning step to remove brick and mortar dust from the exterior show surface of the brick façade. The composite construction panel system needs no subsequent cleaning of exterior brick wall surface with a solution such as an acid solution, as compared with installation and/or repairs of traditional brick and mortar walls, saving even more time of initial installation compared to conventional brick element façade installation.

Process for Panel Manufacture

Referring now to the isometric illustration of FIG. 5, a machine for manufacturing composite panels according to the preferred manufacturing process of the present invention is shown generally at 32. The panel manufacturing machine 32 has a production table 34 that is supported and stabilized by table legs 36 and defines a table top 38 that serves as a substantially flat and horizontally oriented mold support member. The panel manufacturing machine 32 also includes a press device 40 having a press support plate member 42 and a moveable platen 44. The moveable platen is driven by a motorized actuator 46 that may conveniently take the form of a hydraulically energized ram or an electrically driven actuator member or any other suitable mechanism for driving the moveable platen 44 downwardly and applying desired mechanical force to a mold, shown generally at 51, that is situated on the press support plate member 42. During its reciprocating movement the moveable platen 44 is guided by a plurality of guide bars 48 that extend through guide openings 50 formed in the edges of the press support plate member 42.

The manufacturing process for the finished polymer-bonded brick or composite wall panels is initiated by placing on the production table 34 a generally rectangular mold base 52 of the mold 51. The mold base 52 defines a rectangular mold pocket, recess or receptacle 54 therein having a bottom receptacle wall 56. The rectangular mold base 52 may be composed of wood, metal or any of a number of suitable polymer materials or composite materials. If desired, a mold composed of a suitable material such as silicon may be placed within the mold recess 54 to provide location devices or geometry for precise location of thin brick elements within the mold. Preferably, however, a masonry element alignment jig 53, shown in FIGS. 6 and 6A, is placed in the rectangular mold recess or receptacle 54 of the mold base 52 and defines a multiplicity of masonry element sites 58 within the mold recess. Each of the masonry element sites includes means for precise location and alignment of one of the thin masonry elements. Suitable means for masonry element location with respect to the bottom wall 56 of the mold preferably takes the form of masonry element locator pins 59 that extend upwardly from the masonry element alignment jig 53 to a height less than the thickness of the thin masonry elements. As shown in FIG. 6 and best in FIG. 6A, each of the thin masonry element sites 58, in the case of thin masonry elements of rectangular brick shape, is preferably defined by eight locator pins 59 with two of the locator pins being positioned in aligning relation with each of the four corners of a thin rectangular masonry element 24 as shown in FIG. 6A. The locator pins 59 position the thin masonry elements 24 in accurately spaced relation with one another to define grout spaces between them and prevent the thin masonry elements from shifting laterally during the panel manufacturing process. This feature permits each finished composite construction panel to have the resulting appearance of a portion of a brick and mortar wall, with the even spaces between the thin masonry elements serving to provide the appearance of the conventional mortar joints of the masonry wall.

It should be noted that the preferred embodiment of the present invention pertains to the composite construction panels having rectangular masonry elements as shown in FIGS. 1, 6 and 6A. However, it is not intended to restrict the scope of the present invention solely to rectangular masonry elements having the appearance of thin bricks. For thin masonry elements having the somewhat irregular and interfitting appearance of stone, to closely replicate the appearance of a stone wall, the alignment members or pins of a specifically designed stone positioning jig will be located according to a repeating pattern utilizing specific stone shapes and dimensions. The thin stone panel finish elements, like thin brick elements 24 of FIG. 6A, are placed "outer or front surface down" within the masonry element sites 58 that are defined by the locator elements or pins 59 of the alignment jig 53, thus positioning the thin masonry panel finish elements 24 in properly oriented and spaced relation with one another. This feature permits the grout filled spaces between the thin masonry elements to represent the mortar spaces or grooves for defining mortar joints of natural appearance. The uneven face surface positioning of the stones of a stone wall can be replicated by the construction of the special jig or by stone support and positioning members or both.

In the alternative or in addition, masonry element location may be achieved by providing alignment ridges 60 on the bottom wall 56 of the mold base 52 as shown in FIG. 6B or by providing location geometry in a mold composed of silicon or other suitable flexible mold material. The alignment ridges 60 permit secure and accurate positioning of each of the thin masonry elements 24 so the spaces between the thin masonry elements are evenly spaced and define the appearance of mortar joints. The alignment ridges 60 also prevent lateral shifting of the thin masonry elements 24 during the panel manufacturing process. Other means for accurately locating a plurality of masonry or masonry-like elements with respect to a mold base may also be provided within the spirit and scope of the present invention.

A generally rectangular screed panel member 62, shown in FIG. 7 and having a part thereof shown in greater detail in FIG. 7A, is placed in removable assembly with the mold base 52, immediately above the array of accurately arranged and spaced thin brick elements 24. The screed panel member 62 defines a planar bottom surface 63 for engagement with the inner or back faces of the thin brick members and has a multiplicity of grout deposit holes or slots 64 that are positioned in aligned registry with the grooves or spaces that are defined between adjacent thin brick elements being supported by the jig or mold 53 of FIG. 6. To accomplish precision alignment of the grout deposit holes or slots 64 it is necessary to align the screed panel member 62 with the grout spaces between the finish elements 24. One suitable means for accomplishing screed alignment is in the form of alignment pins projecting from the mold and alignment holes in the screed panel to receive the alignment pins. During automated composite construction panel manufacture, the panel manufacturing machine is designed to precisely position the screed panel with respect to the mold. As is evident from FIG. 7A the configurations of the grout deposit holes or slots 64 are designed for strategic deposit of substantially dry pulverulent or particulate material, referred to herein as "grout", into the grooves or spaces between the individual thin brick elements. The shapes of the grout deposit holes or slots 64 determine the amount and strategic location of the dry grout material in the grout spaces. The grout particulate preferably incorporates a binder composition that enables it to be compacted to an essentially solid porous form and to maintain its compacted form as successive panel manufacturing process steps occur. The planar wall surface 63 of the screed panel member 62 engages and covers the back surfaces of the thin masonry members and ensures that the back surfaces remain free of the dry particulate grout material as the grout material is deposited through the holes or slots 64 of the screed panel member 62 and into the grout spaces between the thin brick members. This step in the panel manufacturing process can be accomplished simply by applying the dry grout particulate material to the upper surface of the screed member 62 and then sweeping or wiping it through the grout deposit holes or slots 64 so that an essentially measured quantity of the grout material falls precisely into the "grout spaces" between the thin brick members. Alternatively, a grout application system may be provided for directly depositing grout material into the openings or slots 64 of the screed panel member 62, so that very little grout particulate, if any, is permitted to come into contact with the upper surface of the screed panel member or the back surfaces of the thin brick members while in position in the panel mold.

After the grout deposit operation has been completed, the screed member 62 is removed from the mold so that loose dry pulverulent or particulate grout material is present and substantially evenly distributed within the grout spaces 69 between the thin brick members 24. As stated above, since portions of the screed member 62 cover the back faces of the thin brick members 24 during the grout deposit operation, the back faces of the thin brick elements 24, having been covered by the screed member during grout deposit, will be substantially free of any grout particulate.

With reference to FIG. 8, it is desirable to subject the loose grout material to desired compaction within the grout spaces between the thin brick members so that the grout material will be evenly distributed and will maintain its compacted form. Grout compaction prepares the grout to receive an uncured or substantially liquid polymeric material, such as mixed but uncured urethane foam, so that the liquid polymeric material applied in a subsequent step penetrates to a desired depth within the grout but does not penetrate completely through the grout material. This feature of the present invention permits a layer of the grout material to be bonded or otherwise secured to the polymeric substrate so that the grout becomes permanently fixed within the grout spaces. This feature also ensures that none of the polymeric material fully penetrates the porous grout and becomes exposed to view within the grout spaces, which would otherwise detract from the desired ornamental appearance of the masonry wall construction panels.

One suitable system for grout compaction takes the form of a compressive force application mechanism, shown generally at 80 in FIG. 8 which includes an actuator and actuator control system 82, such as a pneumatic or hydraulic actuator, having a vertically moveable actuator member 84 to which a stiff rectangular backing panel member 78 is secured. A rectangular panel 76 of a rather soft and deformable material, such as an open cell foam material, is secured to the lower surface of the stiff rectangular backing panel member 78, providing a rather soft body of material that can engage the back face surfaces of the thin brick members and be deformed into the grout spaces 69 when downwardly directed compressive force is applied to the stiff backing member 78. When the actuator mechanism 82 is energized to provide downwardly directed force, the vertically moveable actuator member 84 will drive the stiff backing member and its open cell foam panel 76 downwardly until the foam panel comes into contact with the upper surfaces of the thin brick members 24. Further downward movement of the stiff backing member 78 and its open cell foam panel 76 against the back face region of the composite construction panel being manufactured and will conform the open cell foam material to the configurations of the thin brick members 24 and cause portions of the foam material to enter the grout spaces 69. When this condition occurs, portions of the open cell foam material will come into contact with the grout material that has previously been loosely deposited through the holes or slots 64 of the screed member 62 and into the grout spaces 69 between the thin brick members and will cause even distribution and compaction of the loose grout material. As the grout material is compacted, its binder composition will cause the grout to be compacted to a rather rigid porous form so that it remains in place within the grout spaces 69 throughout the panel manufacturing process. The porous nature of the compacted grout material defines interstices into which the uncured polymeric foam material will migrate as the mold and panel assembly is later subjected to the mechanical pressure of a press. The compacted nature of the grout material, the consistency and applied volume of the liquid polymeric substrate material, and the pressure that is applied by the press, are all designed to ensure that the polymeric material does not penetrate completely through the grout material to the front or "show" surface where it can be seen. The cured polymeric material provides support for the grout material within the grout spaces 69 and ensures that the visible grout material has the appearance of a conventional mortar joint for a brick or other masonry wall. It should be noted that FIG. 8 represents a manufacturing step that can be a part of an automated panel manufacturing system whereby two or more construction panels may be actively engaged in the manufacturing process at any point in time. This feature is discussed in greater detail below in conjunction with multiple manufacturing steps that are evident in the schematic illustration of FIG. 10.

After completion of the grout compaction operation, the actuator mechanism 82 is energized to move the stiff backing member 78 and its open cell foam panel 76 upwardly or upwardly and laterally to an out-of-the-way position. At this point the mold base or jig 52, with its brick members 24 and compacted grout 26, can be subjected to a succeeding identical manufacturing operation as depicted in the exploded illustration of FIG. 9 and as presented in the schematic manufacturing illustration of FIG. 10. This feature can occur with the mold base 52 in stationary condition or it can occur by moving the mold base to a subsequent manufacturing station, such as is described below concerning FIG. 10.

A polymer foam applicator, shown generally at 68 in the exploded illustration of FIG. 9, is connected with a polymer foam mixing and supply system shown schematically at 66 and is energized to apply a contiguous polymeric foam substrate to the entire back face 71 of the brick wall replicating composite construction panel being manufactured. This feature can be accomplished by moving the polymer foam applicator 68 with respect to the exposed back face region 71 of the composite construction panel or by moving the mold base or jig with respect to the polymer foam applicator 68. The polymeric foam substrate 16 provides the construction panel with mechanical structure containing a thermal insulating quality and also serves to provide a moisture and air barrier to minimize the potential for passage or wicking of water and air through the panel. This feature provides the composite construction panels and thus the resulting building structure with thermal insulation, resistance to water ingress and air infiltration, as well as materially enhancing the structural integrity of the resulting paneled wall. While the use of a two component polymeric material such as polyurethane foam material is frequently mentioned in this specification for purposes of simplicity and to facilitate ready understanding of the present invention, it is not intended to limit the spirit and scope of the present invention solely to polyurethane or any other two component polymeric material. For example, a single component material or a three or more component polymeric material having the desired qualities may be used with equal success. And it is not intended to limit the present invention solely to the use of polyurethane as the polymeric substrate 16. Any polymeric material that can set and become hardened by the chemical reaction of its polymeric constituents, such as polyurea, or light- or thermally-activated, or chemically-catalyzed polymers, and which are readily available, may be employed within the spirit and scope of the present invention.

After the polymeric substrate 16 has been applied to the composite construction panel being manufactured, as is also shown in the exploded isometric illustration of FIG. 5, an upper jig or mold lid 70 is then brought into closing assembly with the lower jig or mold base 52. To provide the construction panel with an interior surface of planar configuration, an interior sheathing or backing panel 14, shown in FIGS. 2-5 and other FIGS., forms the bulk of the back or interior surface of the finished composite construction panel. The interior sheathing or backing panel 14 adds materially to the stiffness and structural integrity of the finished composite construction panel 10 and is sufficiently flexible that the composite construction panel will have flexibility during installation and prolonged service. The interior sheathing or backing panel 14 may be composed of oriented strand board "OSB", a cement-containing panel or sheet, a polymer or polymeric composite, plywood, or any of a number of other suitable rectangular panel sheet materials. The interior sheathing or backing panel 14 preferably has either a porous surface or has a surface containing enough microscopic irregularities to provide a bonding surface between the substrate and the polymeric foam substrate. When wood or a similar material is utilized to form the interior panel substrate 88, the material may be of the treated variety to enhance the water-resistant character thereof and resist the tendency of various wood or board materials to becoming warped by excess moisture. It should be borne in mind that only the exterior or façade surfaces of the composite construction panels are water-proof. The presence of wood or other similar materials as the backing substrate of the composite construction panels renders the back faces of the panels typically un-protected from the presence of moisture. It is necessary therefore to minimize the potential for ingress of moisture through the construction panels of assembled wall structures.

During composite panel manufacture, as shown in the exploded isometric illustration of FIG. 9, the sheathing panel substrate 14 is releasably secured within a recess or pocket 72 that is defined within the upper jig lid 70 as shown by broken lines 74. As the upper jig lid 70 is assembled to the jig or mold base 52, the interior or sheathing substrate 14 will come into intimate contact with the uncured polymeric foam material that has been deposited as an integral, substantially contiguous, layer or substrate covering the entire back face of the thin brick members and grout assembly within the mold base 52. Assembly of the upper jig lid 70 to the mold base 52 accurately positions the backing panel substrate 14 with respect to the uncured polymeric foam substrate of FIG. 4 so that a secure bond of the substrates is established and the completed composite construction panel will not tend to de-laminate over time.

The upper jig lid 70 is lowered into assembly with the mold base 52. The jig or mold and the upper jig lid is then subjected to mechanical compression, such as by means of a press, for a sufficient period of time for the interior sheathing substrate 14 to become bonded to the polymeric substrate, for pressure induced polymer penetration into the grout, and for any small spaces that might exist within the mold to be completely filled with the polymeric material. Since the polymeric material is preferably polymer foam, its expansion after mixing of its components will cause complete filling of the mold and will generate internal pressure that enhances the density of the cured polymeric foam. Additionally, the mechanical compression, together with the configuration of the mold base, ensures against deformation of the construction panel during curing of the polymeric foam material. Pressure-induced compression of the polymeric foam material during the manufacturing process causes the polymeric foam material to produce the desired density to enhance the moisture proofing and structural integrity of the completed composite construction panels. This pressure also enhances the integral bond that is established between all of the substrates and components of the composite construction panel. When the mechanical compression of the construction panel is released, the completed construction panel will naturally maintain its flat configuration. Thus, when the construction panel is subsequently installed to the vertical components of a building framework, such as wall studs, there will be no need to apply fastener force to conform the configuration of the construction panel to the configuration of the building structure, as long as the building framework is substantially flat and true.

As mentioned above, in its compacted state the dry pulverulent grout material 26 defines minute interstices between its grains or particles. These interstices permit pressure-induced penetration of the uncured liquid urethane foam material to a desired depth within the grout as the result of the compression that is applied to the jig or mold base 52 and the mold lid or cover 70. Within the mold cover 70 is defined a downwardly facing pocket or receptacle 72 within which is releasably positioned a sheathing panel substrate 14, shown in broken lines 74 in FIG. 9. The sheathing panel substrate 14 is preferably of rectangular configuration but may have any other desired configuration to suit the configuration of the composite construction panel being manufactured. The urethane foam or other polymeric substrate, which solidifies upon curing, binds the grout material 26 to the sheathing panel substrate 14 and to the bricks or other masonry elements 24 of the composite construction panel being manufactured. The sheathing substrate panel 14 is released from its pocket or receptacle 72 upon opening or release of the mold cover 70 with respect to the mold base 52. It is important, however, that the uncured liquid polymer composition penetrate into the interstices of the compacted grout material only to a predetermined extent without passing completely through the grout material. This feature is controlled by application of limited or controlled volume and/or mechanical pressure to the uncured polymeric foam substrate to deform the substrate to establish intimate contact with the thin brick elements and to force the polymeric foam material into the interstices of the compacted grout material.

After completion of the grout compaction operation, to secure the composite panel components in assembly, to provide the composite panel with an integrated moisture impervious substrate, and to further provide the composite panel with enhanced structural integrity, the polymer foam applicator mechanism 68, shown in FIG. 9, is activated to mix polymeric foam constituents and distribute a substrate of uncured, essentially liquid polymeric foam composition onto the entire exposed back surface portion 71 of the composite construction panel being manufactured. As mentioned above, it is intended that portions of the liquid polymeric foam material will enter the grout spaces between the brick or masonry elements and come into contact with the compacted grout material. Sufficient polymeric foam material is deposited into the mold to form the surround structure 18 of the completed composite construction panels 10. Thus, the polymer foam mixing and applicator mechanism 68 is designed to apply a measured quantity of liquid polymeric foam material to the back surface portion of the panel being manufactured to efficiently accomplish these features.

The compressive forces cause some of the urethane foam material to enter the interstices between the grains of the pulverulent or granular grout material, binding the grout material in place and causing further distribution of the grout material in the spaces between the masonry elements. Final curing of the polymeric foam material ensures that the masonry elements and grout material are in fixed assembly with one another and with respect to other components of the construction panel structure. At this point in the panel manufacturing process, manufacture of the construction panels is complete. The upper jig lid is removed, after which the completed construction panel is removed from the mold, essentially in the form available for immediate use. The mold is then prepared/cleaned for re-use in the manufacture of another composite wall construction panel.

The present invention is readily adapted for automated, enhanced volume manufacture. Multiple conveying devices enable the simultaneous operation of any and/or all steps in the panel manufacturing process such that numerous composite construction panels may be simultaneously produced or be at various stages of production at the same time. One suitable system for automated manufacture is shown schematically in the schematic illustration of FIG. 10 where mold bases or other panel support and movement devices 52 traverse an assembly line in a direction from left to right as shown by movement arrows along a mold conveyor 94. The mold conveyor may be in the form of a conveyor belt or may be chain driven or may be of any other suitable type of conveyor; however it is important that the conveyor have the capability for causing incremental movement of a plurality of mold bases and for achieving precision location of the mold bases at the various production stations of the assembly line. As the mold bases or other panel support devices 52 are moved from station to station by the conveyor 94, various manufacturing steps or operations are performed sequentially. While a single linear conveyor 94 is shown and described for purposes of simplicity and understanding, the conveyor 94 may embody various other component conveyors that are employed to accurately move and position panel components for orderly assembly to achieve composite panel manufacture, essentially without manual assistance by manufacturing personnel. These other or additional component conveyors may bring the various components from supply areas to the manufacturing stations and thus may have other directions of conveyor movement for efficient delivery of components in timely fashion to the various manufacturing stations.

It is necessary to locate multiple thin brick or other masonry elements in precisely spaced relation within a mold base or panel support 52. A thin brick element placement mechanism 96 is moved downwardly by an actuator mechanism 98 and deposits the thin brick elements at specific sites within the mold base. These brick element sites can, if desired, be established by the thin brick element placement mechanism 96 or may take the form of brick location by mold ridges or locator pins of a brick placement jig as described above. The thin brick element placement mechanism 96 may be provided with vacuum support devices or a mechanical brick gripping apparatus to permit the thin bricks to be retained during lifting and movement to the specific brick location sites of the mold base. After the thin brick elements have been located with respect to the mold base, the conveyor 94 will locate the mold base with respect to a screed 100 and screed actuator mechanism 102. The screed member is moved by the actuator mechanism 102 into contact with the back faces of the brick members to permit deposit of grout material through the screed openings and into the grout spaces between the thin brick members essentially as described above. Though a planar screed member is shown at 100 and represents the preferred embodiment of the present invention, it should be borne in mind that the screed member may be of essentially cylindrical configuration for rotary movement as the mold base is moved beneath it or as the screed member is moved relative to a mold base. The grout material may be delivered by a grout feed and applicator mechanism that extends into the rotary cylindrical screed member and deposits a measured quantity of grout particulate through the openings of the screed member and into the grout spaces between the thin brick members.

In the alternative the assembly line may incorporate a planar or rotary grout compaction mechanism 104 having an open cell polymer or any other suitable deformable body 106 that engages the back faces of the thin brick members and achieves predetermined compaction of the grout material that is present within the grout spaces. The deformable body 106 is mounted to a press plate 108 that is moved by one or more actuating shafts or posts 110 being moved upwardly and downwardly by a suitable actuating mechanism of the planar or rotary grout compaction mechanism 104. The deformable body 106 of the grout compaction mechanism, whether of planar or rotary character, engages the back face region of the composite panel being manufactured and achieves controlled compression or compaction of the grout particulate within the grout spaces between the masonry elements while at the same time holding all of the thin brick members in place on the mold base. After the compaction operation has been completed the grout compaction mechanism is actuated to raise the deformable compaction element from the back face region of the panel being manufactured, thus permitting movement of the mold base or other panel support device to the next manufacturing station for application of the moisture resistant polymeric foam substrate of the composite construction panel.

A polymeric foam mixing and application system 112 is located adjacent the assembly line defined by the conveyor 94 and provides for support and movement of a polymeric foam mixing and applicator mechanism 68 being supported and moved by an actuator mechanism having an actuating post or posts 116 relative to a composite construction panel being manufactured. The polymeric foam mixing and applicator mechanism 68 is designed to apply a contiguous layer or substrate of polymeric foam thermal insulating and moisture proofing material to a composite construction panel, either during movement of the composite panel by the conveyor or during movement of the polymeric foam mixing and applicator mechanism 68 relative to the composite construction panel 10, as determined by the design of the panel manufacturing system.

Just after a polymeric substrate has been applied to the entire back face region of the composite construction panel being manufactured, and before the polymeric foam material has become hardened by the chemical reaction of its polymer constituents, a backing or sheathing panel 14, carried by a mold closure member 70 is moved into surface to surface contact with the uncured polymeric foam material. A sheathing panel positioning mechanism 120 is provided with one or more support and actuation posts 122 to which a sheathing panel support and positioning mechanism 124 is mounted. The sheathing panel support and positioning mechanism 124 defines a recess or pocket 125 within which the backing or sheathing panel 14 is releasably received. The backing or sheathing panel 14 may be composed of any number of suitable panel materials such as plywood, OSB, particle board, polymer or any composites of these materials. Backing or sheathing panels may be retrieved from a supply or storage site, such as by lateral movement of the backing or sheathing panel positioning mechanism 120 and then accurately positioned on the polymer foam substrate. The backing or sheathing panel positioning mechanism 120 is then actuated to apply a predetermined mechanical pressure to the sheathing panel 14, thereby subjecting the entire composite panel being manufactured to the desired compression pressure during curing of the polymeric foam material. It may be necessary or appropriate to position a layer of release material, such as paper or a polymer film, between the mold closure member 70 and the backing or sheathing panel 11, to ensure that none of the uncured polymeric material comes into contact with the mold closure member as it is subjected to compression. The controlled mechanical pressure causes the polymeric foam material to penetrate to a desired extent into the compacted grout material, to become bonded with the brick or other masonry elements of the composite construction panel structure, and to become bonded to the backing or sheathing panel 14. This mechanical pressure also causes the resulting polymeric foam material to have a desired increased density that enhances the structural integrity and water and air imperviousness of the resulting composite construction panel. The finished composite construction panels, thus manufactured, are then in the form of integrated panel substrate structures that will retain their structural integrity and provide many years of efficient service as building wall components, lasting as long as masonry walls and other components of a building structure. The composite panels, due to the presence of the polymeric foam substrate, will provide efficient thermal insulation for the wall structure of a building and will serve as an efficient barrier to air infiltration and an efficient moisture barrier to prevent intrusion of water into building wall structures.

According to the process of the present invention, finished composite construction panels are dusted and cleaned and final inspection is performed for quality control prior to packaging and crating. The complementary size and light weight capacity of the panels is very user friendly for easy installation. The typical 4'×19 3/16" height and width of the construction panels and the 1 1/8" panel thickness are preferred for most panel application conditions. These dimensions are considered to be quite manageable and result in the proper interlocking of the overall wall surface in relation with the building framework members and with respect to the adjacent composite construction panels of a completed wall installation. The panels can be cut utilizing conventional masonry cutting blades and attached to sub-surfaces using standard exterior grade screws. The screws are placed strategically in the mortar joints and are consistent with the 16" or 24" on-center frequency of the wall stud members of a conventional wall framework. Screw heads and adjacent panel joints are treated with clear silicone caulking and while wet, the same dry grout or mortar used in the manufacture of the panel is dusted over or air sprayed onto the wet caulking thus bonding to the caulk. The use of caulking, with its pliant and resilient characteristics, allows for expansion and contraction of both wall and panel components while maintaining waterproofing or water resistance of the panel joints and provides the panel mortar mixture with a consistent appearance. Any residual grout or mortar particulate can be brushed or washed from the panel surface once caulking has cured per the manufacturer's recommended timeframe.

Ends and edges of the composite construction panels are manufactured for abutting relation with adjacent panels above, below and at the sides. Each panel end is manufactured to establish precise interfitting relation with the opposite end of an adjacent panel and the top and bottom edges of the panels are mortised for a precision fit with the opposite side of the adjoining panel. This feature allows for a constant and consistent blending of the finish materials of the panels that make up a complete wall. Corner installations are accomplished by fitting the ends of construction panels flush with the corner of the building structure and by filling in the missing brick spaces in the manner described above. In the event the available building framework space is not sufficient for installation of a complete construction panel, the panel may be cut to size using a masonry saw to avoid damaging the brick or other masonry façade. The panels may also be cut to the desired height and installed to a building framework in the same manner.

All materials used in the manufacture and installation of these panels are completely waterproof, and weather resistant requiring little or no maintenance. The mortar or brick cracking that is typically experienced during the service life of brick and mortar wall installations will not typically be experienced to a significant extent with wall installations that incorporate the composite construction panels of the present invention. Since it is not expected that cracking of the wall or thin brick elements is likely, repair of that condition is much easier than on a conventional wall as the components to be repaired (replaced) are surface-mounted and not structurally integral to the wall, as in a conventional brick façade. The flexibility of the composite construction panels will permit certain wall component movement over time, without resulting in the formation of panel cracks.

Brick or composite construction panels of this invention can be applied over old siding, conventional sheathing, pre-fabricated panel systems, bare stud framework and virtually in any place on any wall in virtually any type of construction.

Uniqueness of the Design of the Product

1. An exterior/interior composite wall panel is provided that includes, in the one panel, multiple integrated wall components including sheathing, vapor barrier, insulation, and brick, masonry or other façade materials and being capable of simple and efficient installation to form a unique siding system in one complete, water-shedding, interlocking wall system. The composite construction panels of this invention also minimize air infiltration through the wall structure of a building that employs the panels as exterior siding components. Each composite construction panel is easily installed with minimal labor for a significant labor and time savings. Each pre-manufactured composite brick veneer or masonry wall construction panel incorporates a number of integrated layers or substrates including sheathing, thermal insulation, vapor barrier and exterior finish. The novel composite wall construction panels permit finish wall construction to be accomplished in single step after framing.

2. The interlocking system of the panels has an inner metal alignment flashing that allows the system of panels to shed water, so that the panels, 48"×19 13/16"×1 1/8", form the watertight, airtight, finished exterior of the structure.

3. Use of thin brick instead of full thickness brick for the building exterior reduces the foundation requirements for the perimeter of the concrete pad because the overall weight is significantly less (up to approximately 80% weight reduction).

4. The panel sheathing, in conjunction with the exterior wall framing, takes the wind-loads of the structure, as opposed to the usual stack of regular full brick in a brick façade, which often is an essentially separate structure of bricks that must be attached and reinforced as the initial (primary) wind load barrier of the structure.

5. Panels can be applied with galvanized or coated deck screws to a wood framework or with self-tapping screws for a metal framework. The attachment screws are applied either in the unfilled recesses for the brick (masonry element sites 58) that cover the end gaps or can be applied through the grout in the middle of the panel. The heads of the screws are subsequently covered completely by the thin brick that covers the exposed ends of the panels where they abut each other, completely hiding the attachment mechanism from sight. The field attachment screws are then completely covered with silicone and grout. Screws that are applied through the existing grout lines are covered with caulk and sprayed grout at the same time the end panel thin bricks are grouted 6. The silicone adhesive is used for attaching the bricks in the voids that cover the ends of the various panels as the system is applied to the exterior or interior of a building. It is also used at the edges of the bricks to hold the grout between the brick and the existing grout outline at the ends of the panels. As with the grout, these "extra" thin bricks are attached with this adhesive to allow flexure at the joint, preventing the cracking of the brick and/or grout if there is a light movement in the wall after assembly.

7. Components and function(s) of the composite wall panel:

| Function | Component |
| --- | --- |
| wall sheathing | OSB, plywood, MDF (interior use only) |
| vapor barrier | Polyurethane foam, urethane foam, or any polymeric material that becomes catalyzed and hardened by the chemical reaction of its constituents |
| insulation | Polyurethane foam, urethane foam, or any polymeric material that becomes catalyzed and hardened by the chemical reaction of its constituents |

| Function | Component |
| --- | --- |
| exterior brick façade | Thin bricks, stone or masonry-like members |
| waterproofing | Polymeric panel substrate, panel spine members and overlaid interlocking metal flashing between panels |
| interlocking | Panel spine members and overlaid interlocking metal flashing between panels |

FIG. 11 is a vertical sectional view illustrating a conventional brick veneer wall structure of a building, shown generally at 130, representing the prior art. The wall structure 130, as illustrated by the sectional view, incorporates a wall framework 132 that is shown to be supported by a foundation 134. The wall framework 132 incorporates stud members 133, sill members 135, and cap members 137. It should be noted that the foundation 134 for the brick veneer wall of FIG. 11 must extend outwardly beyond the wall framework 132 to provide a support ledge 136 for the brick and mortar veneer wall material 138. Sheathing panel material 140 is fixed to the framework 132 to provide for thermal insulation and to provide a moisture barrier. During current construction practices the sheathing panel joints between sheathing panels are not typically sealed in any manner, so in humid regions moisture can penetrate the sheathing sheathing to a sufficient extent to be potentially damaging to the typically wood wall framework. Also, the conventional brick veneer wall structure 130 typically defines an air gap or vent 142 between the interior surface of the brick veneer wall 138 and the insulation and moisture resistant sheathing panels that are fixed to the exterior of the framework. Additionally, the conventional brick veneer wall employs mechanical tie members 144 to provide the brick and mortar wall with lateral support by the building framework.

In comparison with the brick veneer wall structure of FIG. 11, the vertical sectional view of FIG. 12 shows a wall structure generally at 150 that is constructed in accordance with the principles of the present invention. The exterior wall structure 150 comprises a conventional wall framework 132, having framework components that are essentially the same as described in connection with FIG. 11. The wall framework 132 is supported by a foundation 154 that is of less expensive construction as compared with FIG. 11 in that it does not include a brick support ledge. The foundation 154 can be slightly smaller as compared with the foundation 134 of FIG. 11 because it does not need to extend significantly beyond the outer limits of the building framework 132. The foundation 154 can be designed to support less weight as compared with the foundation 134 of FIG. 11 because it is not designed to support the weight of a conventional brick and mortar wall, thus further minimizing the cost of the foundation. The resulting wall construction of FIG. 12 will be much thinner than the thickness of a conventional brick veneer wall and will be of significantly less weight, thus providing for significant cost savings without detracting from the durability and longevity of the wall. Composite construction panels 10, embodying the principles of the present invention, are fixed to the wall framework 132 by means of fasteners such as screws and provide thermal insulation characteristics, and serve as structural enhancement for the framework structure of the wall and serve as a moisture barrier for the wall to prevent ingress of moisture through the wall construction. The wall panels also inhibit air infiltration through the wall structure. The fasteners penetrate the composite construction panels, typically being located in grout lines or in the void spaces of the masonry element sites, and engage within the wall studs 160 or other structural members of the wall framework 132. If desired, the composite construction panels 10 may be applied over existing wall materials such as being applied over the conventional sheathing 140 of FIG. 11. The composite construction panels, as discussed in detail above, support thin brick or other façade members 24 which define the outer surface of the completed composite paneled wall 150. Significant savings in time, labor and materials will be the result that is gained through employment of the present invention. The resulting completed wall construction will withstand equal or greater wind loads as compared with that of a conventional brick veneer wall. Moreover, as building settling and thermal movement occurs over time, conventional brick veneer walls tend to crack and must be repaired. The resulting composite paneled wall construction of the present invention, having significant flexibility, will tend to become flexed to a limited extent by building structure movement, without developing any cracks in the ornamental and weather resistant façade.

Uniqueness of the Composite Construction Panel Product

1. A specialized metal jig is used in the manufacture of the composite construction panel. Small metal pins provided in the jig are used to properly align and hold in place all of the thin brick elements during the manufacturing process.

2. A unique thin metal screed is used to cover the back surfaces of the thin bricks while the granular mortar is applied to the gaps or spaces between the adjacent bricks through holes and slots in the metal screed. The screed member keeps the back surfaces of the bricks clean so that the thin brick elements present a clean porous surface for attachment to the polymeric foam material that is applied to them. The screed panel member also limits the amount of mortar that is applied between the bricks to the exact amount that is needed.

3. After the thin metal screed is removed, a foam pad (sponge) of open-cell urethane foam or a similar material, of the same configuration and dimensions as the panel being manufactured, is used to uniformly press the applied grout/mortar within the grout spaces between the thin bricks in the jig assembly, while at the same time holding all of the bricks in place and also keeping the back surfaces of the bricks clean. The foam pad uniformly forces the grout to fill all the voids between the bricks without additional application of mortar or subsequent labor.

4. Once the foam pad has been applied to the mortar, a layer or substrate of polymeric foam is applied to the back region of the composite construction panel, covering the thin bricks and compacted granular mortar to secure all of the panel components together and to function as the primary integral thermal insulation component of the panel.

5. As the urethane or other polymeric material is beginning to cure, a lid to the mold base or jig is aligned with the mold base. The mold lid or cover contains a sheathing panel composed of one of a range of materials including plywood, MDF (Medium Density Fiberboard) [interior use only], masonry, OSB (oriented strand board), or the like. The sheathing panel provides the composite construction panel with significant structural integrity. The mold lid or cover is clamped to the mold base as the polymer foam expands and cures. The polymer foam composition bonds the thin brick and mortar to the substrate panel. The mold lid is held firmly in place until the polymeric foam composition becomes cured to the point that it is dimensionally stable.

6. Once cured, the mold lid is removed to be used again. The composite construction panel is removed from the mold receptacle (containing the brick façade alignment panel or jig, to be used again to manufacture other composite construction panels.

7. Spaces for thin bricks are left blank at the ends of each row of bricks on a composite construction panel to allow alignment with adjacent panels on the wall. (Approximately ⅓$^{rd}$ the length of a brick on one end of a row of bricks, and about ⅔rds the length of a brick on the corresponding other end of the row. The overlap from one row to the next, above or below, changes from ⅓ to ⅔ to ⅓, etc., so that the gap or joint between the adjacent composite construction panels is completely covered.) These spaces are protected during the manufacturing process such that when the finished composite construction panel is ready to be applied to the framework of a building, these surfaces are clean down to the substrate sheathing. The outline of the empty brick spaces is defined by grout lines, such that it is obvious where the thin brick elements are to be positioned. Once the composite construction panels are attached to a wall, the spaces are filled with thin brick and a mortar is applied in the spaces between the bricks. Both the bricks and mortar are applied with a flexible adhesive such as commercial grade silicone or the like to allow for movement of the panels/bricks/mortar without breakage. The adhesive should be resistant to ultra-violet light and resistant to a wide range of thermal and other weather conditions that are expected to be encountered, it should be able to accommodate unusual weather conditions, and it should be sufficiently durable for the designed service life of the exterior wall on which it is used.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A composite construction panel for mounting to the framework or other part of a building, comprising:
   a substantially contiguous substrate of polymeric material defining a moisture and air barrier of said composite construction panel and defining interior and exterior surfaces;
   a plurality of panel finish elements connected to said exterior surface of said substantially contiguous substrate of polymeric material and being disposed in spaced relation with one another to define grout spaces therebetween, wherein said substantially contiguous substrate of polymeric material bonds with said plurality of panel finish elements;
   a pulverulent grout material at least partially filling said grout spaces and being embedded in a matrix of said substantially contiguous substrate of polymeric material within said grout spaces; and
   an interior sheathing substrate connected to said interior surface of said substantially contiguous substrate of polymeric material and defining an interior surface of said composite wall construction panel.

2. The composite construction panel of claim 1, wherein said plurality of panel finish elements are thin masonry elements having the height and width of conventional bricks and having a depth less than the depth of conventional bricks.

3. The composite wall construction panel of claim 1, comprising:
   said panel finish elements having a defined height and width; and
   side portions of said composite wall construction panel defining empty finish element spaces being of said defined height and having a width less than said defined width.

4. The composite construction panel of claim 1:
   wherein said substantially contiguous substrate of polymeric material bonds said panel finish elements and said interior sheathing together,
   wherein at least a portion of said pulverulent grout particulate is being visible within said grout spaces between said finish elements.

5. The composite construction panel of claim 1, wherein said substantially contiguous substrate of polymeric material is a polymeric material having a thermal insulating characteristic, defining an air and moisture infiltration barrier within said composite construction panel and having an adhesive characteristic integrating said plurality of panel finish elements to said exterior surface thereof and integrating said pulverulent grout material within said grout spaces, said polymeric material integrating said interior sheathing substrate with said composite construction panel.

6. The construction panel of claim 1, wherein the substantially contiguous substrate of polymeric material is a bonding agent that bonds the plurality of panel finish elements with the interior sheathing substrate, wherein the plurality of panel finish elements and the interior sheathing substrate are physically and chemically bonded together by the substantially contiguous substrate of polymeric material.

7. A method for manufacturing a composite wall construction panel intended for mounting to the structural framework members of a building, comprising:
   positioning a multiplicity of panel finish elements outer face down and in spaced relation on a support with grout spaces being defined between said panel finish elements;
   distributing pulverulent grout material within said grout spaces;
   applying a substantially contiguous substrate of uncured polymeric material onto said panel finish elements and onto said pulverulent grout material within said grout spaces;
   positioning an interior panel substrate within said substantially contiguous substrate of uncured polymeric material; and
   subjecting said multiplicity of panel finish elements and said substantially contiguous substrate of uncured polymeric material to mechanical compression during curing of said polymeric material and adhering said multiplicity of panel finish elements and said pulverulent grout material in integral relation forming said composite construction panel.

8. The method of claim 7, comprising after said applying a substantially contiguous substrate and before said subjecting said uncured polymeric material to mechanical compression, positioning a sheathing panel onto said substantially contiguous substrate of uncured polymeric material, said mechanical compression at least partially embedding said sheathing panel within said polymeric substrate and bonding said sheathing panel to said substantially contiguous substrate of polymeric material.

9. The method of claim 7, wherein said support being a mold base having a mold receptacle defining a bottom wall and mold side surfaces, said method comprising:
   said positioning step being location of said multiplicity of panel finish elements oriented outer faces down on said bottom wall in spaced relation with one another and in spaced relation with said mold side surfaces; and after said step of distributing pulverulent grout material within said grout spaces said applying step being mixing and depositing said substantially contiguous substrate of uncured polymeric material onto said multiplicity of panel finish elements, onto pulverulent grout material within said grout spaces between said multiplicity of panel finish elements and in spaces between said multiplicity of panel finish elements and said side surfaces of said mold receptacle, causing said polymeric substrate to form a generally rectangular surround of said composite construction panel having substantially straight panel edges.

10. The method of claim 9 wherein said polymeric material is a polymeric foam material and a mold cover of said mold defines a panel recess releasably retaining an interior sheathing substrate therein, said method comprising:

following said applying a substantially contiguous substrate of uncured polymeric foam material and before curing of said polymeric material, moving said mold cover into closing engagement with said mold and positioning said interior sheathing substrate in engagement with said uncured polymeric foam substrate;

applying a compressive force to said mold cover causing said interior sheathing substrate to become at least partially embedded within said uncured polymeric foam material, said compressive force causing said uncured polymeric foam material to substantially completely fill said mold, restrain polymeric foam expansion during curing, and enhance the density of said polymeric foam material; and following curing of said polymeric foam substrate to a dimensionally stabilized state, removing said mold cover from said mold and removing said composite construction panel from said mold.

11. The method of claim 9, comprising:

positioning a masonry alignment jig within said mold receptacle, said masonry alignment jig defining a plurality of masonry element sites and having masonry element alignment members;

providing a plurality of thin masonry elements each having a front face and a back face and having edge surfaces;

positioning one of said plurality of thin masonry elements front face down at each of said masonry element sites, said thin masonry elements each being aligned by said masonry element alignment members and establishing a masonry pattern for said composite wall panel and defining grout spaces between said masonry elements;

after said depositing pulverulent grout material within said grout spaces and applying a substrate of mixed uncured polymeric foam material onto said plurality of thin masonry elements and said pulverulent grout material, assembling said mold cover to said mold base;

applying compressive force to said polymeric foam substrate forcing a portion of said polymeric foam substrate into said grout spaces and into intimate engagement with said plurality of thin masonry elements and into intimate engagement with said pulverulent grout material and maintaining application of said compressive force until curing of said polymeric foam substrate has occurred; and after curing of said polymeric foam material to a dimensionally stable state, removing said composite construction panel from said mold.

12. The method of claim 11, wherein said step of applying compressive force to said polymeric foam substrate comprising:

positioning in force transmitting engagement with said uncured polymeric foam substrate a sheathing panel being releasably received within a mold cover; and applying a force to said mold cover urging said sheathing panel against said uncured polymeric foam substrate with sufficient force to deform said polymeric substrate within said mold and at least partially embed said sheathing panel within said polymeric substrate and establish intimate bonding engagement of said polymeric substrate with said plurality of thin finish elements and in bonding engagement with pulverulent grout material within said grout spaces.

13. The method of claim 11, comprising:

prior to the method step of applying the substrate of mixed uncured polymeric foam material, locating a screed member in covering relation with said thin finish elements, said screed member having a plurality of grout deposit holes located in registry with said grout spaces between said thin finish elements;

depositing said pulverulent grout material through said grout deposit holes of said screed member and into said grout spaces; and after completing said depositing of said pulverulent grout material in said grout spaces, removing said screed member.

14. The method of claim 13, comprising after removal of said screed member, compressing a resilient panel against said thin finish elements with sufficient force causing said resilient panel to enter said grout spaces and achieve compression of said pulverulent grout material within said grout spaces.

15. The method of claim 7 wherein said plurality of thin finish elements are of rectangular configuration, each defining four corners, and said finish element alignment members are alignment pins within said mold receptacle positioned for orienting engagement with the four corners of said thin finish elements, said method comprising:

prior to said step of applying said substrate, positioning each of said plurality of thin finish elements with alignment pins having aligning relation with edge surfaces of said thin masonry elements adjacent to each of the four corners thereof, said alignment pins retaining said thin finish elements against lateral movement from said masonry element sites.

16. The method of claim 7, wherein said applying compressive force comprises:

positioning said mold and mold cover on a support member of a press;

moving a platen member of the press against said mold cover with sufficient force to deform said uncured polymeric material against said thin finish elements and within said grout spaces and against said pulverulent grout material; and maintaining said application of compressive force for a sufficient time for curing of said polymeric material.

17. A method for assembling pre-manufactured composite construction panels to the framework of a building structure, wherein said pre-manufactured composite construction panels have substantially straight side edges and define a plurality of finish element sites, said composite construction panels having a substantially contiguous polymer substrate and having a plurality of thin finish elements fixed to said finish element sites and having pulverulent grout material retained in grout spaces between the finish elements by said substantially contiguous polymeric substrate, said composite construction panels further having a plurality of empty finish element sites on the side portions of said composite construction panels, said method comprising:

mounting composite construction panels to the wall framework of a building with fasteners and with said substantially straight side edges in abutting relation and defining panel joints between adjacent composite construction panels;

after mounting the composite wall panels to the framework, securing thin filler finish elements to each of said empty finish element sites and with grout spaces between said thin filler finish element with one another at least some of the thin finish filler elements bridging and covering said panel joints;

applying caulking material within said grout spaces between said thin filler finish elements, said caulking material initially having a tacky state and curing to a more hardened stabilized state; and while said caulking material is tacky, applying pulverulent grout material to said caulking material for retention within said grout spaces by said caulking material.

18. The method of claim 17, wherein said external thin finish filler elements being in the form of filler panels having assembled groups of external thin assembled to a filler substrate with grout spaces therebetween, said method comprising:

securing said filler panels within said empty finish element spaces of adjacent composite construction panels, said filler panels bridging joints established by abutting side edges of installed composite construction panels;

applying caulking material within grout spaces between said thin finish elements; and applying pulverulent grout material to said caulking material.

19. The method of claim 17, wherein said composite construction panels having edges defining spline slots and receiving spline members engaging within spline slots of adjacent composite construction panels for ensuring precise panel edge alignment when said composite construction panels are installed in edge to edge abutting relation on a building, said method comprising:

fixing a composite construction panel to a building;

positioning at least one spline member within a spline slot of said fixed composite construction panel; and positioning another composite construction panel on said building and moving it laterally into edge to edge abutting relation relative to the fixed composite construction panel and causing said spline slot thereof to receive at least one said spline member of said fixed composite construction panel and define a spline oriented and sealed joint between adjacent composite construction panels; and applying sealant material to said spline oriented and sealed joint.

20. A construction panel for mounting to the framework or other part of a building, comprising:

a substrate of polymeric material having an interior surface and an exterior surface;

an exterior finish element in contact with the exterior surface of the substrate of polymeric material, wherein the substrate of polymeric material directly bonds with the exterior finish element; and a sheathing substrate in contact with the interior surface of the substrate of polymeric material, wherein the substrate of polymeric material directly bonds with the sheathing substrate.

21. The construction panel of claim 20, wherein the exterior finish element and the sheathing substrate are physically bonded together by the substrate of polymeric material, wherein the substrate of polymeric material is a bonding agent that bonds the exterior finish element and the interior sheathing substrate.

22. The construction panel of claim 20, further comprising:

a particulate material, wherein the particulate material is bound by the substrate of polymeric material, wherein the particulate material is bound on the exterior surface of the substrate of polymeric material.

23. The construction panel of claim 20, further comprising:

a composite of particulate material embedded in a matrix of the substrate of polymeric material.

24. The construction panel of claim 20, wherein the exterior finish element comprises a plurality of exterior finish elements having spaces therebetween.

25. The construction panel of claim 24, further comprising:

a composite of the particulate material embedded in a matrix of the substrate of polymeric material, wherein the composite is contained in the spaces between the plurality of exterior finish elements.

* * * * *